United States Patent [19]
Kidston et al.

[11] Patent Number: 5,281,009
[45] Date of Patent: Jan. 25, 1994

[54] ANTILOCK BRAKE SYSTEM WITH CLOSED LOOP CONTROL OF HOLD DURING RELEASE

[75] Inventors: Kevin S. Kidston, New Hudson; Jeannine C. Eddy, Northville; Jerry J. Queen, II, Brighton, all of Mich.; Jeffrey T. Von Der Vellen, Sheboygan, Wis.; Alan J. Lee, Farmington Hills, Mich.

[73] Assignees: General Motors Corporation, Detroit, Mich.; Delco Electronics Corp., Kokomo, Ind.

[21] Appl. No.: 932,290

[22] Filed: Aug. 19, 1992

[51] Int. Cl.$^5$ ............................................. B60T 8/58
[52] U.S. Cl. ..................................... 303/100; 303/97; 303/106; 364/426.02
[58] Field of Search ................... 303/99, 97, 100, 105, 303/106, 107; 364/426.02

[56] References Cited

U.S. PATENT DOCUMENTS

| | | | |
|---|---|---|---|
| 4,223,957 | 9/1980 | Brearley et al. | 303/106 |
| 4,530,059 | 7/1985 | Brearley et al. | 303/97 |
| 4,916,619 | 3/1990 | Walenty et al. | 303/106 |
| 4,917,445 | 4/1990 | Leppek et al. | 303/100 |
| 5,106,171 | 4/1992 | Leppek et al. | 303/100 |

Primary Examiner—Matthew C. Graham
Attorney, Agent, or Firm—Howard N. Conkey

[57] ABSTRACT

An antilock brake controller provides an adaptive pressure hold period that interrupts the release of brake pressure during the pressure release phase of an antilock braking pressure control cycle of a vehicle wheel by holding the brake pressure constant while the wheel slip rate is below a threshold that is adjusted as a predetermined function of wheel slip for the front wheels and as a predetermined function of wheel acceleration for the rear wheels.

7 Claims, 15 Drawing Sheets

ANTILOCK BRAKE SYSTEM WITH CLOSED LOOP CONTROL OF HOLD DURING RELEASE

BACKGROUND OF THE INVENTION

This invention relates to an antilock control system and method for controlling vehicle wheel brakes.

When the brakes of a vehicle are applied, a braking force is generated between the wheel and the road surface that is dependent upon various parameters which include the road surface condition and the amount of slip between the wheel and the road surface. This braking force increases as slip increases until a critical slip value is surpassed. Beyond the critical value of slip, the braking force decreases and the wheel rapidly approaches lockup. Therefore, to achieve stable braking, an antilock braking control system (ABS) seeks to operate wheel slip at or near the critical slip value.

In one known ABS, the brake pressure is modulated by means of a DC torque motor driving a piston in a cylinder whose volume is modulated to control the hydraulic pressure at the wheel brake. The motor is controlled to position the piston at an initial, fully extended home position at which a check valve is unseated to couple the brake system master cylinder to the wheel brake to allow normal braking. When antilock brake pressure modulation is required, the motor retracts the piston (which allows the check valve to close to isolate the master cylinder from the wheel brake) to reduce brake pressure at the wheel brake and thereafter modulates the piston position to provide pressure control for antilock braking. When antilock braking is no longer required, the motor returns the piston to its extended home position. Typically, in these prior systems, the hydraulic pressure at the wheel brake is established based upon the relationship between motor current, motor torque and the hydraulic brake pressure acting on the head of the piston (wheel brake pressure). Motor current as a representation of wheel brake pressure then becomes the controlled parameter to establish a desired braking condition via the brake pressure/motor current relationship.

During ABS controlled braking, when an incipient wheel lock condition is sensed, an ABS cycle is initiated beginning with a pressure release phase wherein the value of motor current at the time the incipient wheel lock condition was sensed is stored as a representation of the brake pressure producing the maximum braking force coexisting with the critical slip between the wheel and road surface and the motor current is controlled to quickly retract the piston to release brake pressure to allow recovery from the incipient wheel lock condition. When a recovery from the incipient wheel lock condition is sensed, a pressure apply phase is initiated in which the motor current is controlled to extend the piston to reapply brake pressure. During the pressure apply phase, brake pressure is initially established at some value related to the previously stored motor current value and the current is then ramped at a controlled rate to ramp the brake pressure at a controlled rate in direction applying brake pressure until an incipient wheel lock condition is again sensed after which the ABS cycle is repeated. In some applications, a pressure hold phase is provided in a region where the wheel is substantially recovered from the incipient wheel lock condition.

In the pressure release phase of this ABS cycle, it is desirable to rapidly reduce brake pressure when an incipient wheel lock condition is sensed in order to prevent the wheel from locking while at the same time reducing the brake pressure only enough to effect wheel recovery from the incipient wheel lock condition and return the wheel to the stable braking region. According, during the release phase of the ABS cycle, it is desirable to quickly release the brake pressure to a value that will affect recovery from the incipient wheel lock condition, but not to some lower pressure value.

SUMMARY OF THE INVENTION

In general, this invention provides for controlled release of the brake pressure in response to a sensed incipient wheel lock condition in a manner to maximize the braking efficiency during wheel lock controlled braking by preventing over-release of the brake pressure during the pressure release phase of the antilock brake cycle.

In accord with this invention, an adaptive pressure hold period during which the brake pressure is held constant is provided in the ABS pressure release phase as a closed loop function of predetermined wheel parameters to provide for wheel recovery from an incipient wheel lock condition without excessive reduction of brake pressure.

The closed loop controlled hold period during the release phase provides adaptation of the system to any situations the vehicle may encounter to prevent excessive release of brake pressure. The pressure hold period interrupts the release of brake pressure in the pressure release phase in response to wheel parameters while those parameters represent the wheel has recovered enough that it no longer needs to release additional pressure to effect a recovery from the incipient wheel lock condition.

In a specific aspect of this invention, the pressure hold period during the release phase is established based upon the wheel slip magnitude and the rate of change in wheel slip. In particular, the release of brake pressure is interrupted and the brake pressure is held constant at a point in time in the pressure release phase in accord with a wheel slip rate threshold that is adjusted as a predetermined function of wheel slip. The adjusted slip rate threshold correlates to when the wheel has recovered enough that it no longer needs any more pressure reduction to affect a recovery from the incipient wheel lockup condition.

In yet another aspect of this invention, the pressure hold portion of the pressure release phase is maintained only for a fixed period of time unless the wheel continues to recover from the incipient lock up condition during the adaptive hold portion of the pressure release phase. Any time the recovery conditions are not present following expiration of the time period, the pressure hold portion of the pressure release phase is terminated and pressure release is again initiated.

DESCRIPTION OF THE DRAWINGS

The invention may be best understood by reference to the following description of a preferred embodiment of the invention and the drawings in which.

DESCRIPTION OF THE PREFERRED EMBODIMENT

Figure 1:
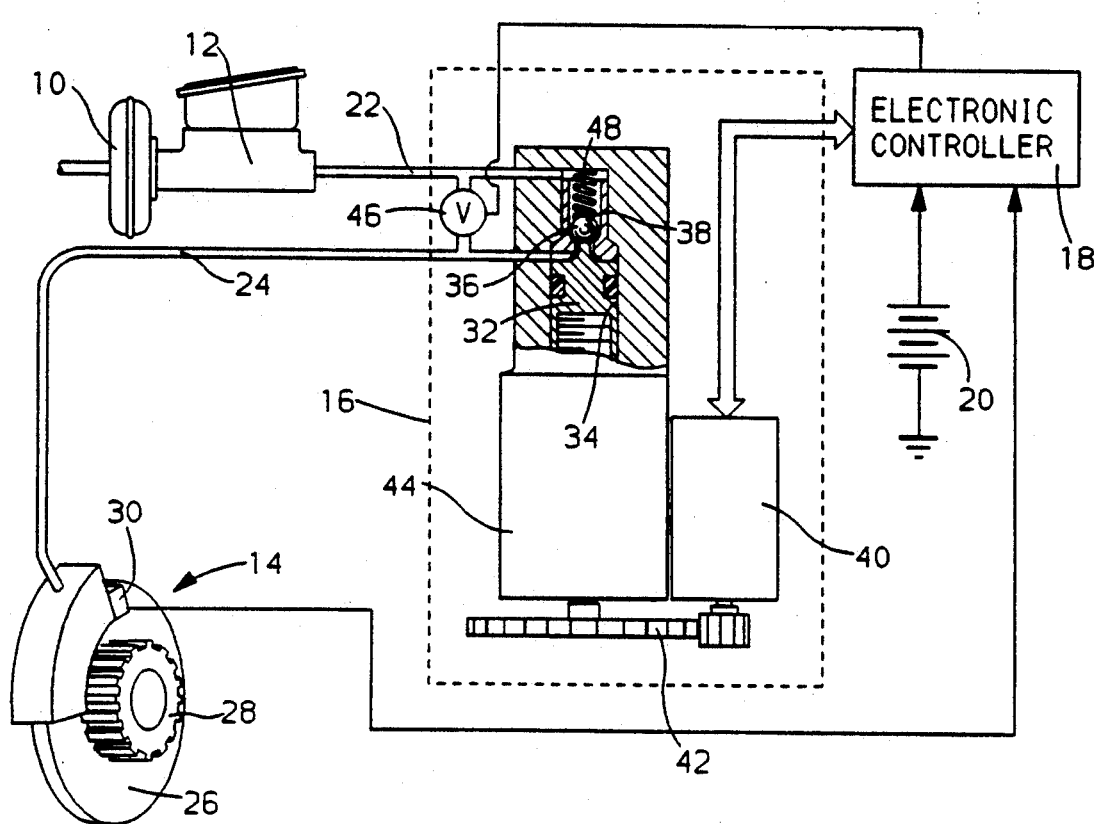
FIG. 1 is a diagram of a wheel braking system including a motor driven pressure modulator for limiting the wheel brake pressure for antilock brake control.

An electric motor driven antilock braking system (ABS) incorporating the principles of this invention is generally depicted in FIG. 1. Referring to FIG. 1, the braking system comprises a hydraulic boost unit 10, a master cylinder 12, a wheel brake 14 associated with one wheel of the vehicle, an electric motor driven hydraulic modulator 16, and an electronic controller 18 for operating the modulator 16 with current from the vehicle storage battery 20. The master cylinder 12 develops hydraulic pressure in line 22 in relation to the force applied to an operator manipulated brake pedal, the line 22 being connected to the brake 14 via modulator 16 and brake line 24. The brake 14 is depicted as a disc brake caliper which develops braking force on the wheel rotor 26 in relation to the hydraulic pressure in the brake line 24. The wheel includes a wheel speed sensing assembly comprised of an exciter ring 28 rotating with the rotor 26 and therefore at the speed of the vehicle wheel and an electromagnetic sensor 30 which monitors the rotation of the exciter ring and provides a signal to the controller having a frequency proportional to the speed of the vehicle wheel.

The modulator 16 comprises a piston 32 axially displaceable in a modulator bore 34, a check ball 36 resiliently seated on a ball seat 38 disposed between the brake lines 22 and 24, and a bi-directional electric motor 40 coupled to the piston 32 via a reduction gearset 42 and a screw actuator 44 to control the axial displacement of piston 32. A hydraulic bypass passage including a normally closed electromagnetic valve 46 is coupled in parallel with the check ball 36/seat 38 to provide a fluid flow path between the master cylinder 12 and wheel brake 14 when the valve 46 is opened. The gearset 42 is made non-back driveable by hydraulic pressure acting on the head of the piston 32 such as by a known one way spring clutch (not shown).

The electronic controller 18 controls the energization of the motor 40 and operation of the valve 46. When the controller 18 energizes the motor 40 for rotation in a forward direction, the screw actuator 44 extends the piston 32 into the bore 34. When extended so as to engage the end of the bore 34, the piston 32 functions to unseat the check ball 36. This opens the communication between brake lines 22 and 24, and represents the normal or quiescent state of the antilock brake system. When the controller 18 energizes the valve 46 to close off the bypass passage and energizes the motor 40 for rotation in the opposite, or reverse direction, the screw actuator 44 retracts piston 32 within the bore 34 permitting spring 46 to seat the check ball 36 on the ball seat 38, thereby isolating the brake line 22 from the brake line 24 and therefore the brake 14 from the master cylinder 12. In this condition, the brake fluid in line 24 back fills the modulator bore 34 as the piston 32 is retracted, relieving the fluid pressure developed at the brake 14. By controlling the motor 40, the pressure at the wheel brake 14 can therefore be modulated to controlled values less than hydraulic pressure in brake line 22 until such time that the piston 32 is again extended to unseat the check ball 36 at which time the brake pressure output of the master cylinder is communicated to the brake 14.

Figure 2:
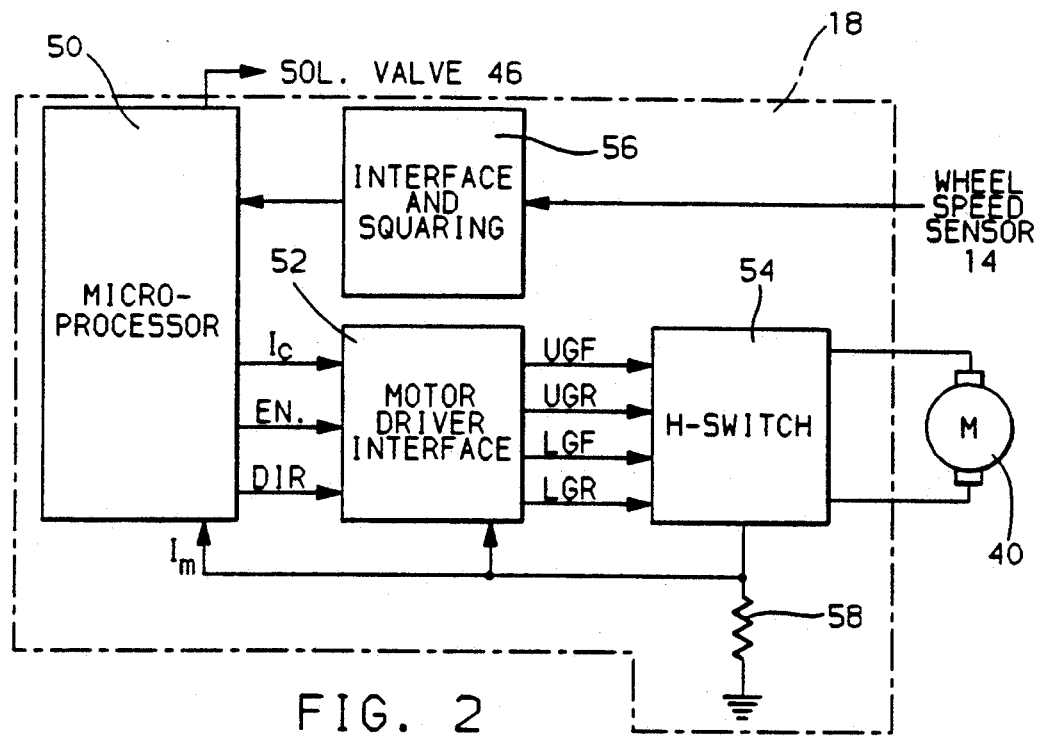
FIG. 2 is a diagram of the electronic controller of FIG. 1 for controlling the current to the motor of the motor driven pressure modulator of FIG. 1.

Referring to FIG. 2, the electronic controller 18 of FIG. 1 is illustrated and generally takes the form of a digital computer based controller. The controller includes a microprocessor 50 that is standard in form and includes the standard elements such as a central processing unit which executes an operating program permanently stored in a read only memory (ROM) which also stores tables and constants utilized in controlling the modulator 16, an analog-to-digital converter, a random access memory (RAM), an input/output circuit utilized to provide motor control signals to a motor driver interface circuit (MDI) 52. The input/output circuit further includes input ports for receiving the wheel speed signal from the output of an interface and squaring circuit 56 having, in turn, an input from the wheel speed sensor 30. The motor 40 current is sensed by a sense resistor 58 through which the motor current passes. The sense resistor voltage representing a measure of motor current and therefore wheel brake pressure is provided to the MDI 52 and to the analog-to-digital converter of the microprocessor 50.

The MDI 52 receives an enable signal EN, a motor current command signal $I_C$ and a forward/reverse direction signal DIR from the microprocessor 50 and controls an H-switch driver 54 to establish the commanded motor current $I_C$ in the required forward or reverse direction. The current to the torque motor 40 is controlled to the command value via a closed loop that responds to the actual motor current represented by the voltage across the sense resistor 58. In response to the direction command DIR, the MDI 52 energizes the H-switch upper and lower forward gates via the upper gate signal UGF and lower gate signal LGF to control the DC torque motor 40 in the forward direction to apply brake pressure and energizes the H-switch upper and lower reverse gates via the signals UGR and LGR to control the DC torque motor 40 in the reverse direction to retract the piston 38 to reduce pressure at the wheel brake.

The microprocessor 50 may take the form of a Motorola single clip microcomputer MC68HC11. The MDI 52 and H-switch 54 may take the form as illustrated in the U.S. Pat. No. 5,081,404 which issued on Jan. 14, 1992.

FIGS. 1 and 2 and the above description relate to a single pressure modulator 16 associated with a single vehicle wheel. However, it is understood that while the system illustrated in those figures shows a single channel for antilock brake control, multiple channels may be provided as required for the particular application. For example, a separate pressure modulator 16 may be provided for each front wheel and a single modulator may be provided for the combined rear wheels for a three channel ABS. The electronic controller 18 will further have associated therewith an interface and squaring circuit 56, MDI 52, and H-switch driver 54 for each ABS channel.

Figure 3:
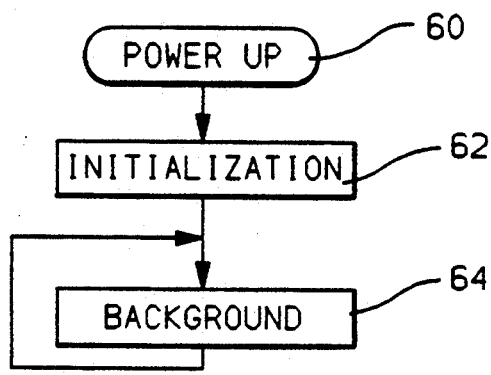
FIGS. 3, 4, 5, 6, 7a, 7b, 7c, 9a, 9b, 10a, 10b, 12, 13, 14 and 15 are flow diagrams illustrating the operation of the electronic controller of FIG. 1 for providing antilock controlled braking in accord with the principles of this invention.

The operation of the electronic controller 18 in controlling the DC torque motor 40 for each of the antilock braking channels in accord with this invention is illustrated in the FIGS. 5-15. The read only memory of the microprocessor 50 contains the instructions necessary to implement the algorithms as diagrammed in those figures. Referring first to FIG. 3, when power is first applied to the system from the vehicle battery 20 such as when a conventional vehicle ignition switch (not illustrated) is rotated to its ON position, the computer program is initiated at a point 60 and then proceeds for system initialization at step 62 which entails clearing registers, initializing various RAM variables to calibrated values and other standard functions. When the initialization routine is completed, the program proceeds to execute a background routine 64 that includes the antilock brake control functions for the vehicle wheels. The background routine 64 is re-entered on a time interrupt basis. In this embodiment, an interrupt is generated at predetermined fixed time intervals such as 5 milliseconds. Upon the occurrence of the interrupt, the microprocessor 50 begins executing the functions embodied in the background routine 64.

Figure 4:
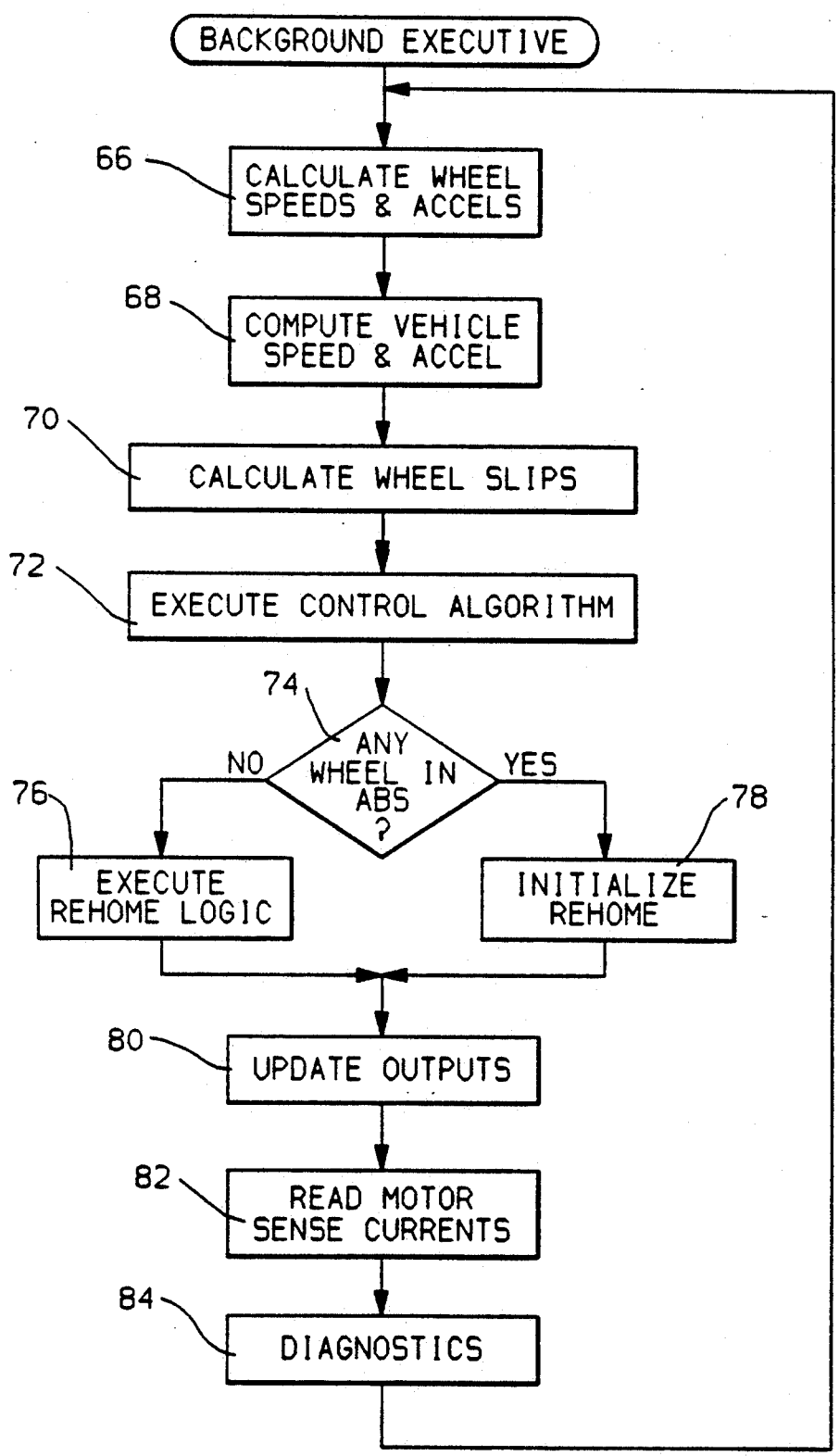

The background routine 64 is illustrated in FIG. 4. This routine is initiated in response to each of the repeated real time interrupts and first proceeds to a step 66 where the speed and acceleration of each of the vehicle wheels are determined from the respective wheel speed signal. Based upon the wheel speed values, a step 68 determines the vehicle speed and vehicle acceleration. The individual wheel slip values are then computed at step 70 based upon the difference between the wheel speed and the vehicle speed. The program next advances to step 72 where the antilock brake control algorithm incorporating the principles of this invention is executed. This algorithm will be described in detail in relation to the flow charts beginning at FIG. 5.

For normal wheel braking, the piston 32 is positioned in its fully extended position unseating the ball 36 from its seat 38 to provide communication between the master cylinder 12 and the wheel brake 14. This is accomplished by a rehome routine which assures that each of the pistons 32 in the various braking channel modulators 16 are in the fully extended position. This is accomplished beginning at step 74 where the routine determines whether any of the vehicle wheels are being controlled by the algorithm of step 72 to limit the applied braking pressure to prevent an incipient wheel lockup condition. If not, a step 76 executes a rehome logic to position all of the modulator pistons at the fully extended position such that the respective hydraulic modulators are transparent to the braking system. Such a rehome routine is illustrated in the U.S. Pat. No. 4,969,756 issued on Nov. 13, 1990. If step 74 indicates antilock controlled braking of at least one of the vehicle wheels via step 72, the routine proceeds to a step 78 where the rehome logic is initialized.

From step 76 or 78, the routine advances to step 80 where the output signals from the microprocessor 50 to each of the braking channels are updated. For example, at this step, various command current values as established by the control algorithm of step 72 are issued to the respective motor driver interface circuits 52 and the output to the respective solenoid valves 46 are updated in accord with the control algorithm 72. The routine next reads the values of the respective motor currents represented by the voltages across the respective sense resistors 58 in the electronic controller 18. These motor current values are used in the ABS algorithm 72 as will be described. Next, various diagnostic routines are executed via step 84 to check the integrity of the ABS. Following step 84, the background executive then awaits the occurrence of the next real time interrupt upon which the steps are again repeated as described.

Figure 5:
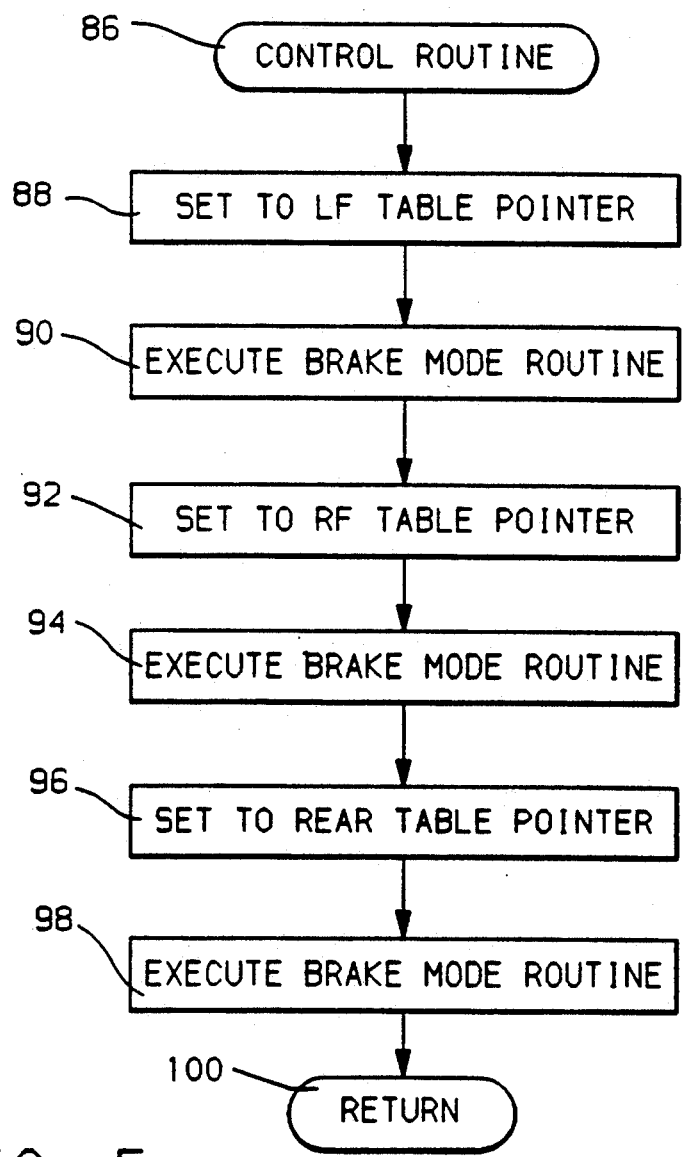

The antilock brake control algorithm 72 is generally depicted in FIG. 5. As indicated, this routine is executed at the frequency of the real time interrupts, which in this embodiment are provided at 5 millisecond intervals. In general, the control routine provides for the execution of a brake mode routine for each of the braking channels. In this embodiment, three ABS channels are provided, one for each of the front wheels and one for controlling the pressure in common to the rear wheels.

The routine is first conditioned to execute the brake mode routine in reference to the left front braking channel by setting a left front table pointer at step 88. The brake mode routine is then executed at step 90 utilizing the wheel parameters and control variables associated with the left front wheel. The right front table pointer is then set at step 92 followed by execution of the brake mode routine at step 94 utilizing the right front wheel parameters and control variables. Similarly, upon completion of the brake mode routine associated with the right front wheel, the routine sets the rear table pointer at step 96 after which the brake mode routine is executed at step 98 utilizing the rear wheel parameters and control variables. The routine then returns to the background routine at step 100.

Figure 6:
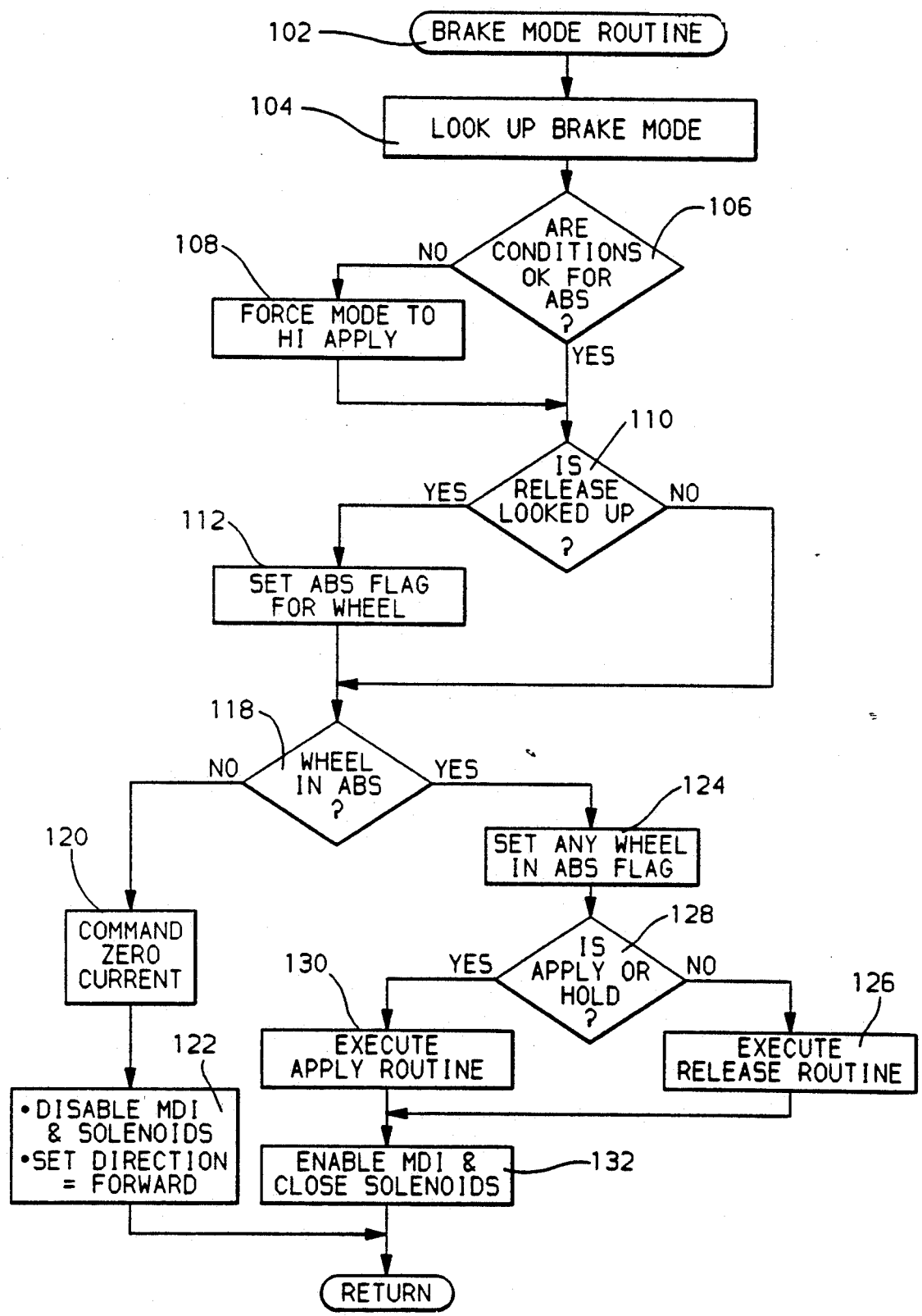

The brake mode routine executed in FIG. 5 at the steps 90, 94 and 98 for each of the ABS channels is illustrated in FIG. 6. This routine is entered at step 102 and then advances to step 104 where the antilock braking mode is obtained from a ROM lookup table as a predetermined function of wheel slip and wheel acceleration. The ROM lookup table provides for multiple number of apply modes, such as 3, each having a related rate of increase in brake pressure as a function of wheel acceleration and wheel slip, a multiple number of release modes, such as 3, each having a related pressure release motor current value for releasing brake pressure as a function of wheel acceleration and wheel slip, and a hold mode representing a condition whereat the brake pressure is to be maintained at a constant value. In general, the apply modes are stored as a function of wheel slip and acceleration representing a wheel recovery condition and provide for higher rates of increase in brake pressure with increasing values of wheel acceleration and decreasing values of wheel slip. The release modes are stored as a function of wheel slip and acceleration representing an incipient wheel lock condition and generally provide for higher values of release motor current for larger values of wheel deceleration and increasing values of wheel slip. The hold mode is stored in the table at locations addressed by combined values of wheel slip and acceleration representing onset of an incipient wheel lock condition.

The lookup table establishes the particular brake mode as a function of wheel acceleration and wheel slip with the table being preestablished so as to provide a threshold between the brake pressure apply, release and hold modes such that when the combination of wheel acceleration and wheel slip represents an incipient wheel lockup condition, the table indicates one of the brake release modes whereas if the combination of wheel acceleration and wheel slip represents a recovered condition, the lookup table indicates one of the brake apply modes.

At step 106, the routine determines if the conditions are acceptable for antilock controlled braking. For example, in this embodiment, antilock controlled braking is not permitted if the vehicle speed is very low such as below 3 miles per hour or if the diagnostics routine of step 84 has indicated a fault condition. If one of these conditions exists, a step 108 forces the brake mode to a high pressure apply rate so as to quickly restore brake pressure and to force termination of antilock controlled braking.

From step 106 or step 108 whichever is applicable, the program proceeds to step 110 which determines if a release mode was determined by step 104 in response to an incipient wheel lock condition. If so, an ABS flag for the wheel is set at step 112 indicating that antilock controlled braking for that wheel has been initiated. Otherwise step 112 is bypassed.

The routine then proceeds to a step 118 which samples the state of the ABS flag referred to in step 112 to determine if antilock controlled braking for the wheel has been initiated. If the flag is not set indicating normal braking of the wheel, the routine proceeds to a step 120 where a zero current is commanded to the corresponding torque motor 40 and then to step 122 where the MDI 52 and solenoid 46 for the wheel are disabled and the direction command DIR to the MDI 52 is set to forward. The routine then returns to the control routine of FIG. 5 which then repeats the routine for the next identified wheel.

Returning to step 118, if the ABS flag is set indicating antilock controlled braking has been initiated, a flag generally indicating antilock controlled braking of one of the wheels is set at step 124. If the next step 128 indicates a release mode was identified at step 104, a brake pressure release phase of an ABS pressure cycle is entered by execution of a release routine at step 126. If step 128 indicates a hold or apply mode was identified at step 104, a pressure apply phase of an ABS pressure cycle is entered by execution of an apply routine at step 130. Step 132 then enables the MDI 52 for the wheel and energizes the solenoid 46 of the modulator 16 associated with the wheel to close the bypass passage.

The release routine 126 provides for relieving the brake pressure applied to the wheel brake 14 to allow recovery for an incipient wheel lockup condition and the apply routine 130 provides for holding the pressure at a constant value when a hold mode is identified by step 104 in response to a substantial recovery from the incipient wheel lock up condition and provides for increasing the brake pressure when an apply mode is indicated by step 104 in response to recovery from the incipient wheel lockup condition.

In general operation of the brake mode routine of FIG. 6, when antilock controlled braking is initiated in response to an incipient wheel lock condition resulting from an excessive brake pressure applied by the vehicle operator, an ABS pressure cycle is initiated including (A) a pressure release phase initiated when an incipient wheel lock condition is sensed wherein the motor 40 is controlled to retract the piston 32 to release brake pressure to allow the wheel to recover from the incipient wheel lock condition and (B) a pressure apply phase initiated when a recovery from an incipient wheel lock condition is sensed wherein the motor 40 is controlled to extend the piston 32 to increase brake pressure until an incipient wheel lock condition is again sensed at which time the ABS pressure cycle is repeated. As long as antilock controlled braking is required, the ABS pressure cycle is repeated to prevent wheel lock from occurring.

Figure 7A:
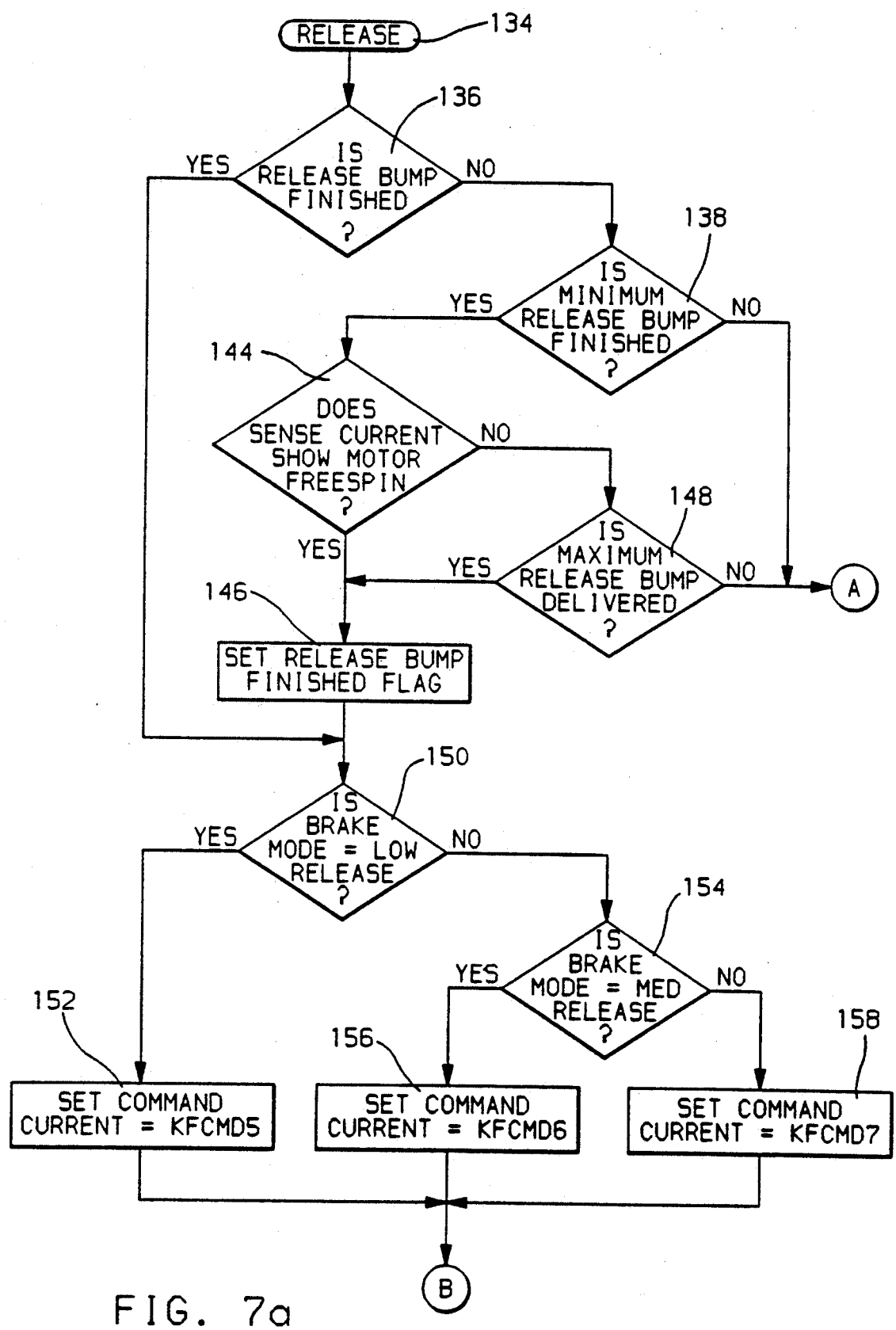
Figure 7B:
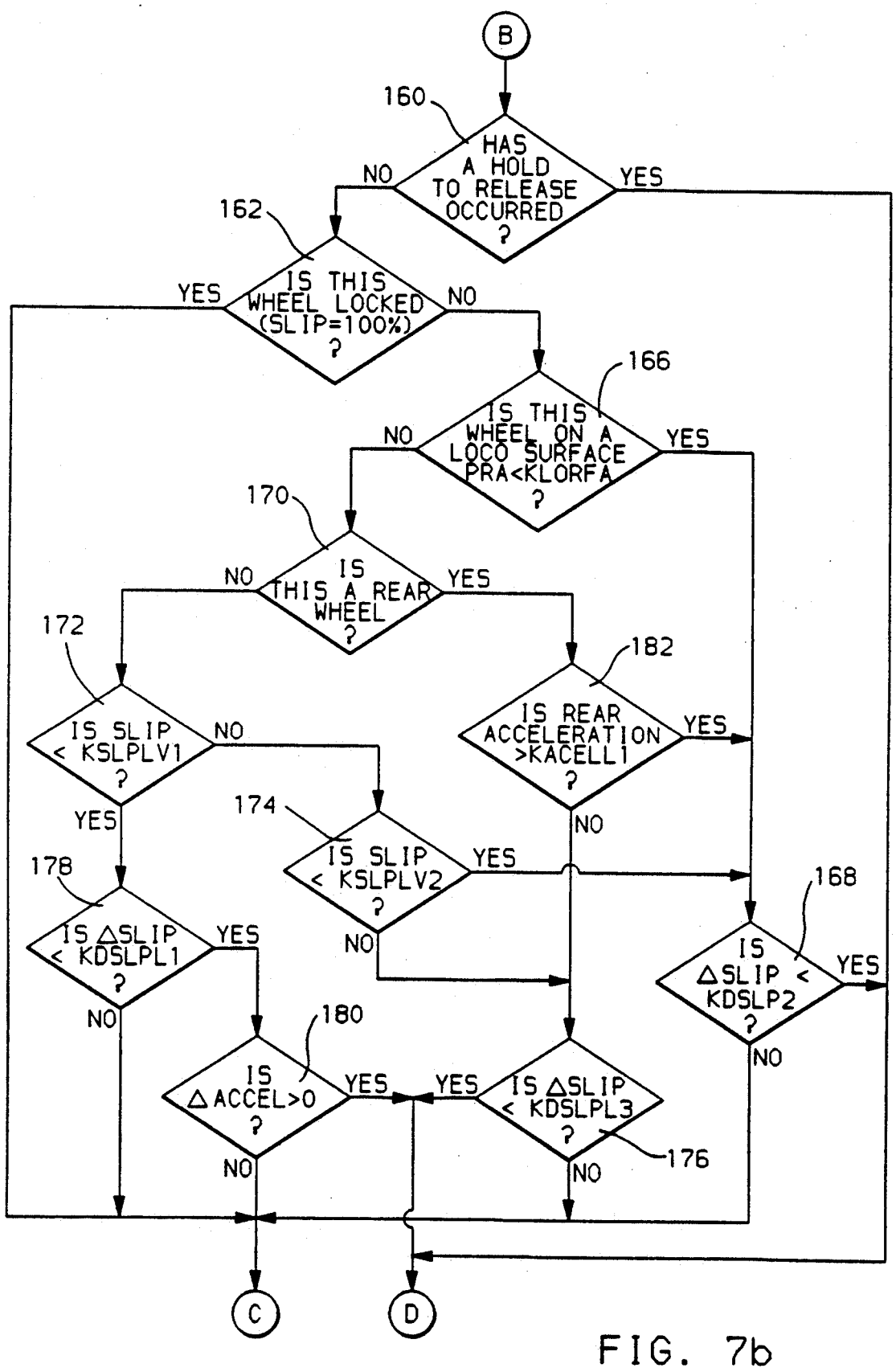
Figure 7C:
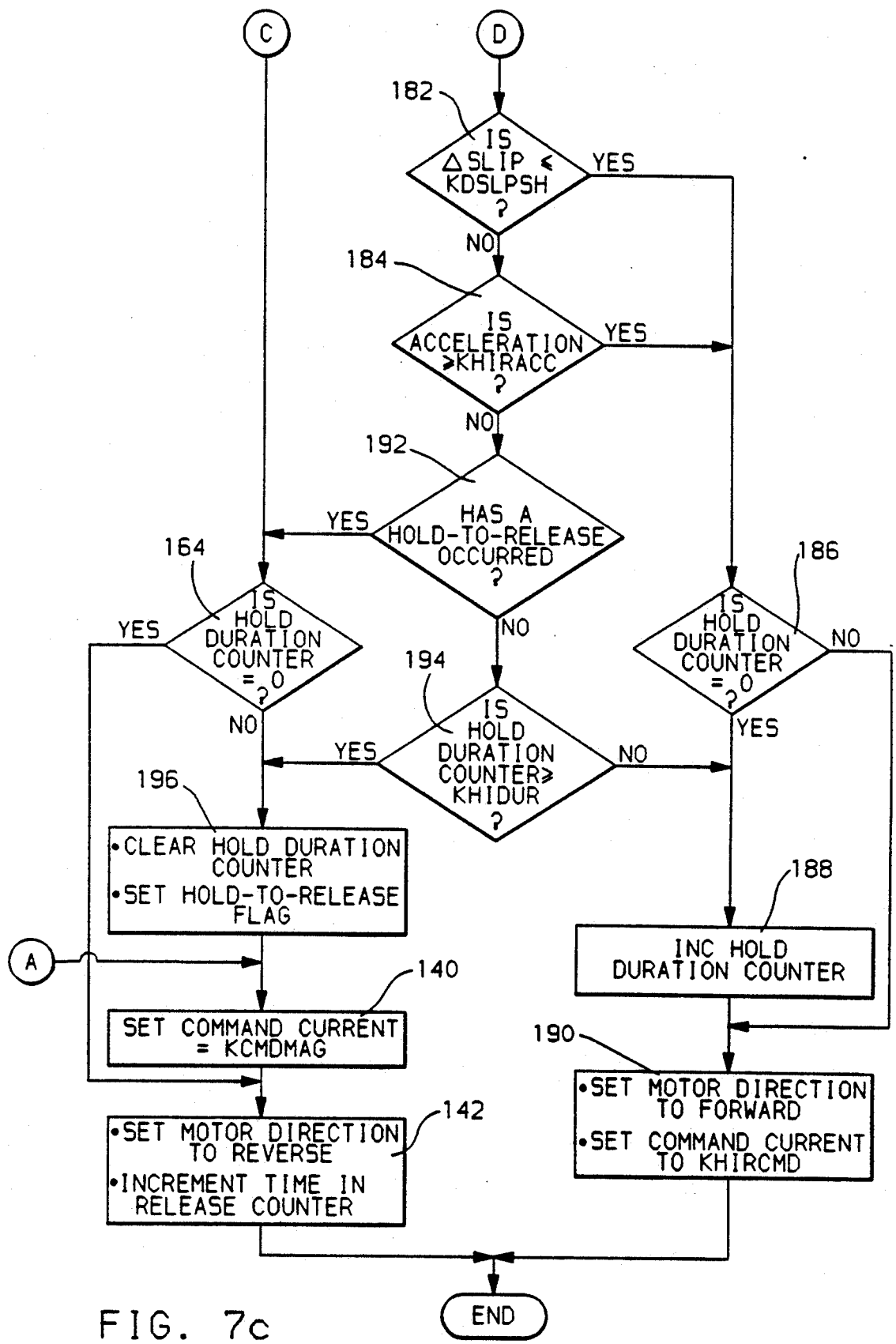

The release routine 126 executed for the identified wheel in response to an incipient wheel lockup condition is illustrated in FIG. 7. To maximize the braking efficiency of the wheel, when an incipient wheel lockup condition is first sensed as represented by step 104 first indicating a release mode, the release routine first applies a "release bump" in the form of a maximum current command to the torque motor 40 in the reverse direction. This provides for rapid response to the incipient wheel lock condition by quickly reversing the motor direction and accelerating the motor to quickly initiate retraction of the piston 32 to begin pressure reduction. Following the release bump, the motor current is then controlled to the level corresponding to the particular release mode identified by step 104 to further provide controlled retraction of the piston 32 to continue the reduction of braking pressure.

In order to maximize braking efficiency, the release routine further provides for an adaptive pressure hold period during the brake pressure release phase even though step 104 otherwise continues to indicate a release mode. This adaptive hold is provided as long as the wheel slip and wheel slip rate parameters indicate a recovery condition will normally be achieved without further brake pressure reduction. By use of this adaptive hold during release, the amount of pressure release is minimized to maximize the wheel braking efficiency.

Referring now to FIG. 7, the release routine is entered at point 134 and advances to step 136 where it determines whether or not the release bump has been delivered. Assuming initially that the release bump has not been fully delivered, a step 138 determines whether or not a minimum release bump period has expired. Again assuming that the release bump has just been initiated, the program then proceeds to a step 140 where the motor current command is set to a maximum value KCMDMAG. In one embodiment, this command may represent a motor command current value of 20 amps. Thereafter at step 142 the motor direction command DIR is set to reverse and a time in release counter is incremented timing the period of brake pressure release. This counter provides an indication of the net total time that the motor 40 is controlled in reverse direction to reduce braking pressure at the wheel brake 14. Until the minimum release bump period has expired (represented by a predetermined time in release count) the steps 136-142 are repeated to continue the release bump. As indicated, this provides for rapid reversal of the DC torque motor 40 and acceleration in the reverse direction to quickly initiate retraction of the piston 32 to reduce braking pressure to effect recovery from the incipient lockup condition.

When the minimum release bump period has expired, the routine advances from step 138 to step 144 to determine if the motor current value indicates that the motor is in free spin. This indicates the motor 40 has reversed and is now rapidly rotating thereby effecting a rapid pressure reduction. When this condition exists, the purpose of the release bump has been accomplished and a release bump finished flag is set at step 146. However, if the motor is not in free spin, the routine advances from step 144 to a step 148 where it determines if the release bump period has attained a maximum allowed release bump period. If not, the release bump is continued via steps 140 and 142 through repeated iterations of the release routine. If the motor does not attain a free spin condition and step 148 detects that the release bump has attained the maximum release bump period, the release bump finished flag is set at step 146.

In summary, the release bump is provided to attain rapid response of the pressure modulator 16 to the incipient wheel lockup condition until such time that the motor attains free spin or the bump period attains a predetermined maximum time. Upon subsequent iterations of the release routine, the foregoing steps for delivery of the release bump are bypassed via step 136.

When the release bump finished flag is set indicating termination of the release bump, the program then proceeds to determine via steps 150-158 the release current corresponding to the particular release mode determined at step 104. In this embodiment three release modes are provided as a predetermined function of the wheel slip and wheel acceleration values. The modes may be identified as low, medium and high corresponding to low, medium and high degrees of severity of the incipient wheel lock condition represented by the combination of wheel slip and wheel deceleration. Accordingly, if step 150 determines the release mode identified at step 104 is the low release mode, the routine sets the command current to the MDI 52 at the low value KFCMD5 at step 152. If steps 150 and 154 determined the release mode identified at step 104 is the medium release mode, the current command is set at the intermediate value KFCMD6 at step 156. If steps 150 and 154 determine the release mode identified at step 104 is the high release mode, the current command is set to the high value KFCMD7 at step 158. As indicated, the various current levels are provided as a function of the particular release mode which in turn is a function of wheel slip and wheel acceleration so as to provide for more aggressive brake pressure release when the wheel conditions indicate a more severe excursion toward a lockup condition.

when the proper release current has been established via steps 150-158, a step 160 determines whether or not there has been a transition from an adaptive hold condition to a pressure release condition. Assuming for the time being that an adaptive hold has not been provided during the present release phase of the ABS pressure cycle, the program then advances to a step 162 to determine if this wheel is presently locked as represented by a slip value at substantially 100%. If this condition exists, the portion of the routine establishing an adaptive pressure hold is bypassed so that release of brake pressure is continued at the motor current level established via steps 150-158. This is provided by advancing from step 162 to a step 164 where the value of a hold duration counter is compared to zero. Assuming initially that the counter is zero which will occur if a prior adaptive hold during this release phase has not occurred, the routine proceeds directly to the step 142 where the motor is set to the reverse direction and the time in reverse counter is incremented as previously described. The effect of the foregoing is to establish the motor current in the direction to retract the piston 32 and at a level established by step 152, 156 or 158 dependent upon the particular release mode determined by step 104.

Returning to step 162, if the wheel is not in a lockup condition, the routine provides for the adaptive hold period during the release phase of the ABS pressure cycle in accord with this invention. In general, the brake pressure is frozen if the wheel parameters indicate the wheel has recovered enough that it no longer is required to release pressure to achieve recovery from the incipient wheel lock condition. By this adaptive closed loop control of pressure hold during the release phase, over release of the brake pressure is prevented for all wheel and road surface conditions to provide maximum braking efficiency for all braking conditions.

Figure 8:
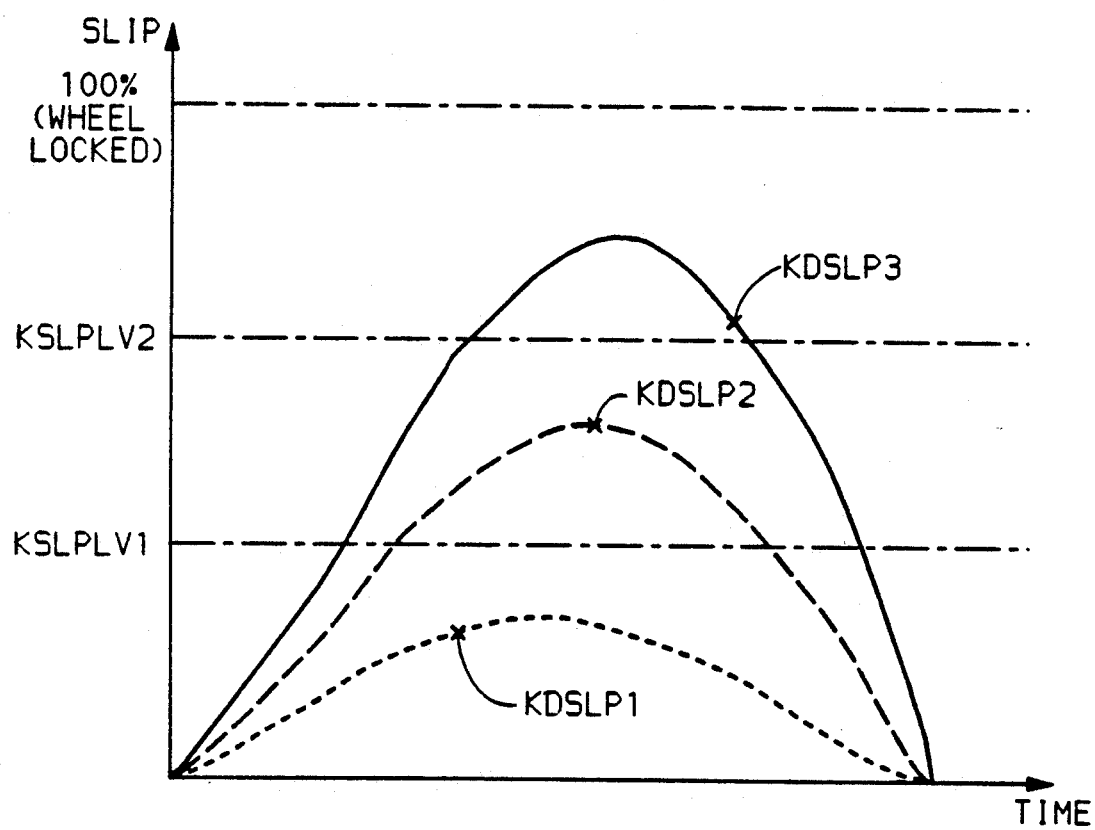
FIGS. 8 and 11 are curves illustrating wheel parameters used by the electronic controller of FIG. 1 in carrying out antilock controlled braking.

In general, the condition for holding the brake pressure during the release phase is based upon a wheel slip rate level threshold that is a predetermined function of wheel slip for the front wheels and a predetermined function of wheel acceleration for the rear wheels. For the vehicle front wheels, the slip rate level threshold is established by three slip rate values selected as a function of wheel slip. The adaptive hold is provided in this embodiment as illustrated in FIG. 8. If the front wheel slip is in a range below a low level threshold KSLPLV1 (such as 15% slip) a hold in release will be provided if the wheel slip rate (represented by the change in the wheel slip over the interrupt period) is less than the low positive slip rate threshold KDSLPL1 indicating slip is increasing at a low rate. In one embodiment, KDSLPL1 may be 0.3% slip change over the interrupt interval. This condition would typically indicate a high coefficient of friction road surface or a shallow ABS pressure cycle. If the front wheel slip is in the range between the low level threshold KSLPLV1 and a higher slip threshold KSLPLV2 (such as 50%), a hold in release will be provided if the wheel slip rate is less than the slip rate threshold KDSLP2 (which may be zero in one embodiment). This condition typically indicates an icy road surface. Finally if the front wheel slip is in a range greater than the slip level threshold KSLPLV2, a hold in release will be provided if the wheel slip rate is less than the threshold KDSLP3 which may be −0.6% change in slip over the period of the interrupt interval. This condition typically indicates a deep ABS pressure cycle. As can be seen, the adaptive hold in release is provided earlier in the release phase for higher coefficient of friction surfaces.

In regard to the rear wheels, the pressure cycle is not as deep as the pressure cycle of the front wheels in an ABS pressure cycle such that there are no differentiating slip profiles between road surfaces. Therefore, the test to provide a hold in release for the rear wheels is based upon rear wheel acceleration. In particular, in this embodiment, if the rear wheel acceleration is greater than a threshold KACELL1, such as −1.2 g, a hold in release will be provided if the wheel slip rate is less than the threshold KDSLP2. Conversely, if the rear wheel acceleration does not exceed the aforementioned threshold, a hold in release is provided if the slip rate is less than the threshold KDSLPL3.

If the wheel is on a low coefficient of friction surface, when the slip rate is zero, the brake pressure is close to zero. Accordingly, the routine provides for holding the pressure constant if the slip rate is zero or decreasing. Accordingly, the threshold KDSLP2 is utilized as previously described to initiate an adaptive hold period, this threshold being zero in this embodiment.

The foregoing is provided by the routine beginning at step 166 which determines if the wheel is on a low coefficient of friction surface by comparing a motor current value PRA to a threshold level KLORFA. The current value PRA is the value of motor current for the wheel that existed when a release mode was first indicated by step 104. Since motor current is a measure of motor torque and therefore brake pressure during the pressure apply phase of the ABS pressure cycle, the value of PRA is representative of the brake pressure when an incipient wheel lock condition was first indicated. Accordingly, a low value of PRA (low brake pressure) at the time an incipient wheel lock condition is first sensed is representative of a low coefficient of friction of the road surface. If the wheel is determined to be on a low coefficient of friction surface, the program proceeds to a step 168 where the wheel slip rate is compared to the threshold KDSLP2. If the slip rate is less than this threshold, a hold condition is indicated. Otherwise, release of brake pressure is maintained by advancing from step 168 to the step 164 previously referred to.

If step 166 determines the wheel is not on a low coefficient of friction surface, the program advances from step 166 to a step 170 and determines if the routine is being executed for a rear wheel. If not, indicating a front wheel, the routine determines the slip range of the front wheel via steps 172–176. If step 172 determines the wheel slip is in the range less than the threshold KSLPLV1, the test for an adaptive hold is based on the slip rate threshold KDSLPL1. If a step 178 determines the slip rate is less than this threshold, and a step 180 indicates that the change in acceleration is greater than zero, a condition for an adaptive hold period is indicated. If steps 178 and 180 do not indicate a condition for an adaptive hold, the routine proceeds to the step 164 to continue pressure release as previously indicated.

If steps 172 and 174 indicate that wheel slip is in the range between the threshold KSLPLV1 and the threshold KSLPLV2, the routine advances to step 168 to determine if the condition exists for holding the brake pressure based upon the slip rate threshold KDSLP2. If the slip rate is not less than this threshold, the routine advances to step 164 to continue pressure release, otherwise conditions for an adaptive hold are indicated.

If steps 172 and 174 determine the wheel slip is in the range greater than the threshold KSLPLV2, the routine proceeds to the step 176 where the slip rate is compared to the threshold KDSLPL3. An adaptive hold is indicated if the slip rate is less than this threshold. otherwise, the program proceeds to step 164 to continue brake pressure release.

Returning to step 170, if the routine is being executed in relation to a rear wheel, the program proceeds to a step 182 where the rear wheel acceleration is compared to the threshold KACELL1 to determine whether the test of step 168 or the test of step 176 is used to determine if a condition for hold during release exists. If the rear wheel acceleration is greater than the threshold value, step 168 determines if the slip rate represents an adaptive hold condition. Otherwise step 176 is executed to determine whether an adaptive hold condition exists.

If the foregoing steps indicate that the conditions for an adaptive hold during release exists, the routine advances to steps 182 and 184 to determine if the wheel parameters represent a good recovery condition. A good recovery condition is indicated by step 182 if the wheel slip rate is less than or equal to a threshold KDSLPSH (such as −0.6% per interrupt period) indicating slip decreasing at a good rate or by step 184 if the wheel acceleration is greater than or equal to a positive threshold KHIRACC (such as +0.25 g). If either one of these steps indicate a good recovery condition of the wheel, a step 186 is executed to determine if the hold duration counter is equal to zero. This step is to assure that the hold duration counter is incremented at least once to indicate that an adaptive hold condition was entered. Accordingly, if the counter is zero, it is incremented at step 188. Following step 188 or if the hold duration counter was not equal to zero, the motor direction command DIR is set to forward and the command current is set to a value KHIRCMD such as zero amps at step 190 to provide for holding the brake pressure.

Even though the steps 182 and 184 may indicate that the good recovery conditions do not exist, the adaptive hold during release is still provided assuming that a previous hold-to-release transition had not occurred during the release phase of this ABS pressure cycle indicating a prior adaptive hold had been terminated and release of pressure reinitiated. This condition is sensed at step 192 where the condition of a hold-to-release flag is sampled. If the flag is reset indicating that a prior hold-to-release had not occurred, the routine advances to step 194 where the hold duration counter is compared to a threshold representing a maximum allowable hold time if the recovery conditions of steps 182 and 184 do not exist. Assuming the hold duration is less than this duration, the routine proceeds to increment the hold duration counter at 188 and thereafter provide for pressure hold via step 190.

If at any time subsequent to the initiation of the adaptive hold in the release phase, the steps 166–180 or step 192 determines that the conditions no longer exist for providing an adaptive hold, the program proceeds to the step 164 where the hold duration counter is compared to zero. Since this counter has been incremented at least once via step 188 as a result of the hold condition being initiated, the program proceeds to a step 196 where the hold duration counter is cleared and the hold-to-release flag is set to indicate a prior hold during release had been provided. Thereafter, the current command is set to the maximum value KCMDMAG and the motor direction command DIR is set to reverse at step 142 to reinitiate a release bump to cause the motor 40 to quickly retract the piston 32 so as to quickly force a recovery from the incipient wheel lockup condition.

After an adaptive hold is terminated and the release bump reinitiated, a subsequent adaptive hold is provided only if the wheel exhibits a good recovery condition. Accordingly, during subsequent iterations of the release routine, the program proceeds from the step 160 to steps 182 and 184 to determine if such a recovery condition exists. If neither of those steps indicate a good recovery condition, an adaptive hold is not reinitiated and the release is continued at step 142 via steps 192 and 164. Otherwise, if a good recovery condition is indicated by either of the steps 182 or 184, the adaptive hold is again provided via step 190.

In response to repeated iterations of the release routine 126 of FIG. 6, the incipient wheel lockup condition will be arrested and the wheel will begin recovering from the incipient lockup condition. When the wheel slip and wheel acceleration represent indicating substantial recovery or recovery from the incipient wheel lockup condition, step 104 will then indicate a hold or apply mode. When a hold or apply mode is selected by step 104, the apply routine 130 is thereafter executed during each of the iterations of the brake mode routine to initiate the pressure apply phase of the ABS cycle and reapply braking pressure to the wheel brake 14.

Maximum braking efficiency can be obtained by rapidly restoring the proper amount of braking pressure to the wheel brake 14 as soon as possible after step 104 first indicates an apply mode. In order to achieve this objective, the apply routine 130 provides for an apply bump in the form of a current command to the torque motor 40 in the forward direction designed to quickly reverse the motor direction and accelerate the motor to extend the piston 32 and reapply pressure to the wheel brake 14. In order to recover the correct amount of pressure during the apply bump, the apply routine 130 provides for adaptive control of the bump duration based upon wheel parameters such that the brake pressure is restored by the bump current to a substantial fraction of the brake pressure existing when an incipient lockup condition was first sensed and which substantially represents the pressure producing the maximum braking effort between the wheel and road surface. Because the apply bump results in motor acceleration, the apply routine provides for a dynamic braking of the motor at the end of the apply bump to remove the energy of the motor and prevent the brake pressure from overshooting the desired target value.

Following the apply bump, an initial current is then applied to the motor that represents the brake pressure existing at the wheel brake 14 at the end of the apply bump, the brake pressure having been established based on the adaptive control of the duration of the apply bump to a desired value based upon the wheel parameters. In order to determine the value of current representing this brake pressure, the apply routine 130 provides for measuring the motor current value at the end of the apply bump if the apply bump has exceeded a minimum duration representing the time required for the apply bump to switch the motor direction and to established motor speed at the steady state speed. Until this time, due to motor dynamics such as the motor back EMF as the motor accelerates, there is not a predictable relationship between motor current and wheel brake pressure. When this duration has expired, the sense current can be considered as being a measure of brake pressure since the motor current is then directly proportional to motor torque. By using this measured value of motor current as the initial reapply current for pressure application, the system is made adaptive for any form of ABS pressure cycle to provide for maximum braking efficiency.

Following application of the initial apply current value, the apply routine then begins ramping the motor current and therefore brake pressure in the apply direction until an incipient wheel lockup condition is again sensed wherein the ABS pressure cycle is repeated.

Figure 9A:
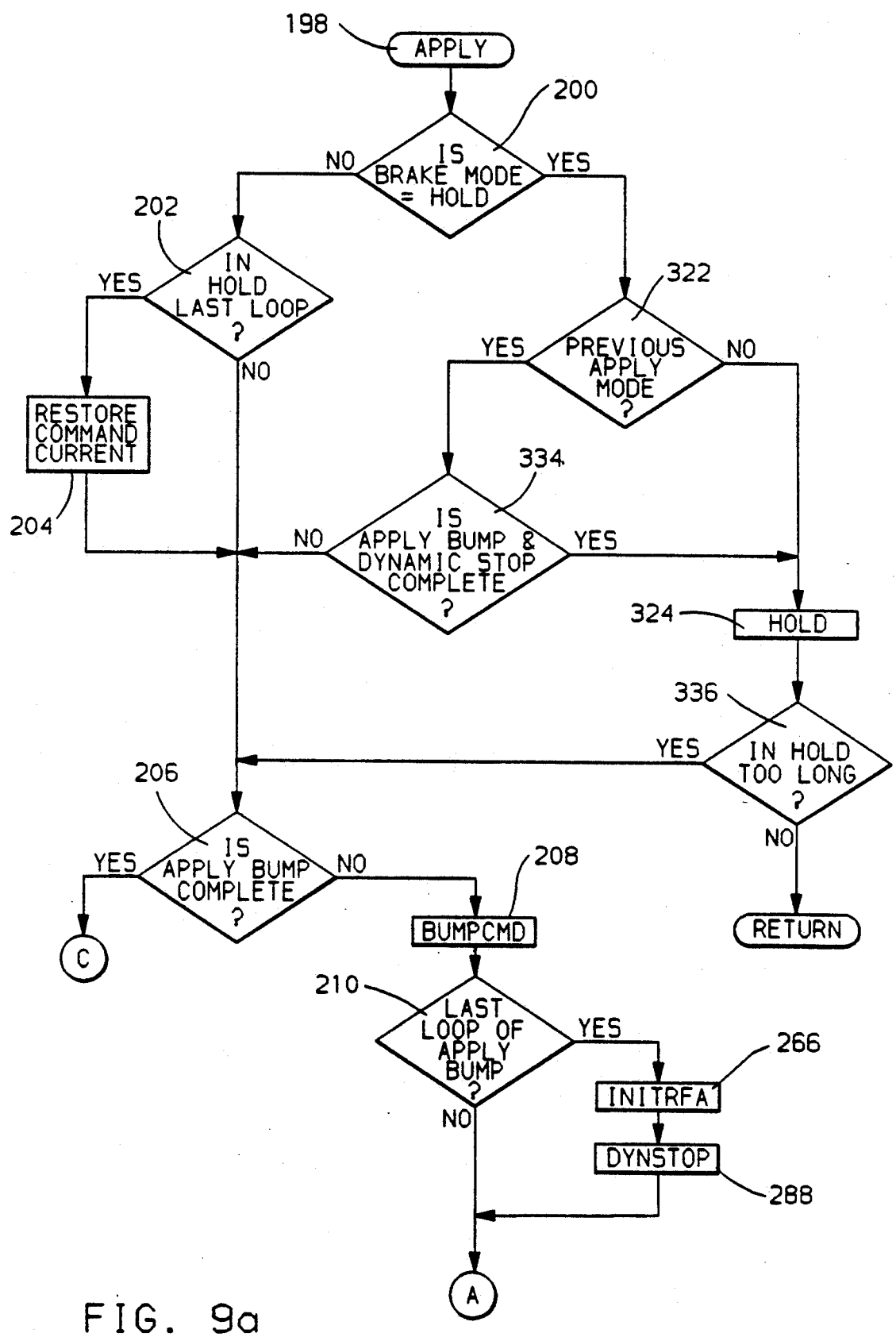
Figure 9B:
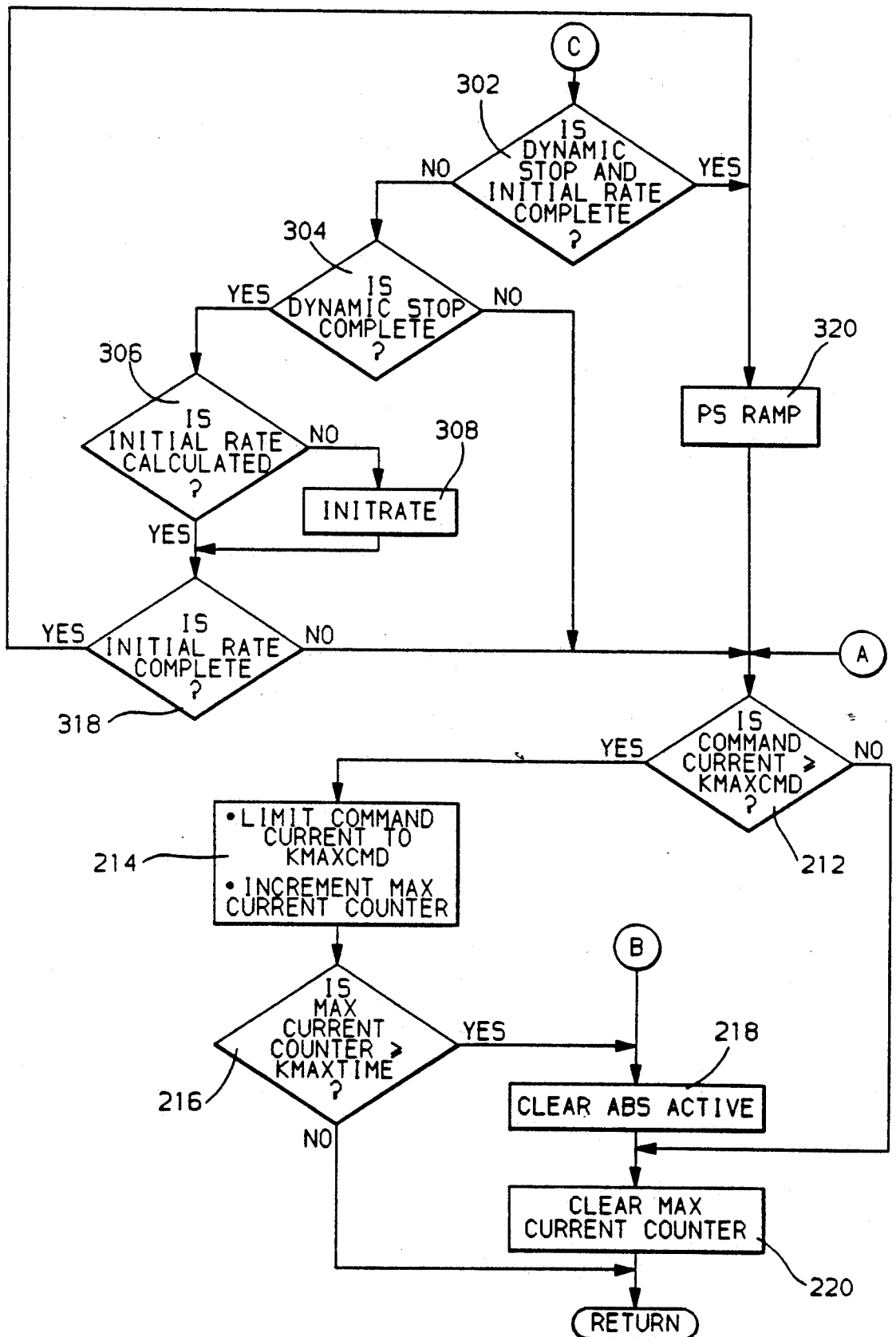

The apply routine 30 is illustrated in FIG. 9. Referring to this figure, the apply routine is entered at point 198 and advances to step 200 to determine whether the brake mode determined at step 104 is a hold mode. Assuming initially that the step 104 of FIG. 6 has indicated one of the apply modes, the program advances to a step 202 to determine whether or not the routine had indicated a hold mode in the prior iteration of the brake mode routine. If so, indicating a transition has just occurred from a hold mode to an apply mode, the routine proceeds to a step 204 where the last current command existing prior to the hold mode is restored. Thereafter or if step 202 does not sense a transition from a hold to an apply mode, a step 206 is executed to determine if the apply bump has been completed. As indicated, an apply bump current command is issued to the torque motor 40 when an apply mode is first indicated by step 104 so as to quickly reverse the motor from reverse direction to the apply direction and to accelerate the motor. Assuming the apply bump has not been completed, a bump command routine is executed at step 208 wherein the apply bump current is commanded to the torque motor 40. The bump command routine 208 will be described in reference to FIGS. 10 and 11.

If the next step 210 determines that the apply bump has not been completed, the routine proceeds directly to a step 212 to determine if the current command to the motor driver interface 52 is greater than or equal to a maximum value KMAXCMD such as 20 amps. As will be described, in the case of braking on a high coefficient of friction surfaces, the apply bump current may in one embodiment be the maximum current value. If this is the case, the program then proceeds to a step 214 where the motor command current value is limited to the maximum value and a maximum current counter is incremented. The maximum current counter is then compared at step 216 with a maximum allowable time period KMAXTIME for operation at the maximum current level and which may represent a time, such as 250 milliseconds. Assuming this time has not expired, which will always be the case for the apply bump, the routine returns to the brake mode routine of FIG. 6. While not occurring during an apply bump, if the maximum current counter otherwise attains the maximum value KMAXTIME during the ABS pressure apply phase, the torque motor 40 has been driven in the apply direction with maximum current for a time period that indicates the piston 32 is in its fully extended position at which the check ball 36 is unseated from the seat 38 to couple the master cylinder 12 to the wheel brake 14. When this condition exists while an apply mode is indicated by step 104, conditions for exiting ABS controlled braking exist. Accordingly a step 218 then clears the ABS active flag for the wheel after which the maximum current counter is cleared at step 220. It is noted that until a release mode is subsequently determined by step 104, the brake mode routine of FIG. 6 proceeds from step 118 to step 120 where the current from the torque motor is commanded to a zero value after which the MDI 52 is disabled and the solenoid 46 de-energized to open the bypass passage. This effectively terminates antilock controlled braking of the wheel brake 14.

Returning to step 212, if the current command is less than the maximum value KMAXCMD, the steps 214–218 are bypassed and the routine proceeds directly to step 220, clears the maximum current counter and returns to the brake mode routine of FIG. 6. As long as an apply mode is indicated at step 104 and until the apply bump is complete, the foregoing steps are repeated with each iteration of the brake mode routine until the bump command routine of 208 has indicated the apply bump is complete.

Figure 10A:
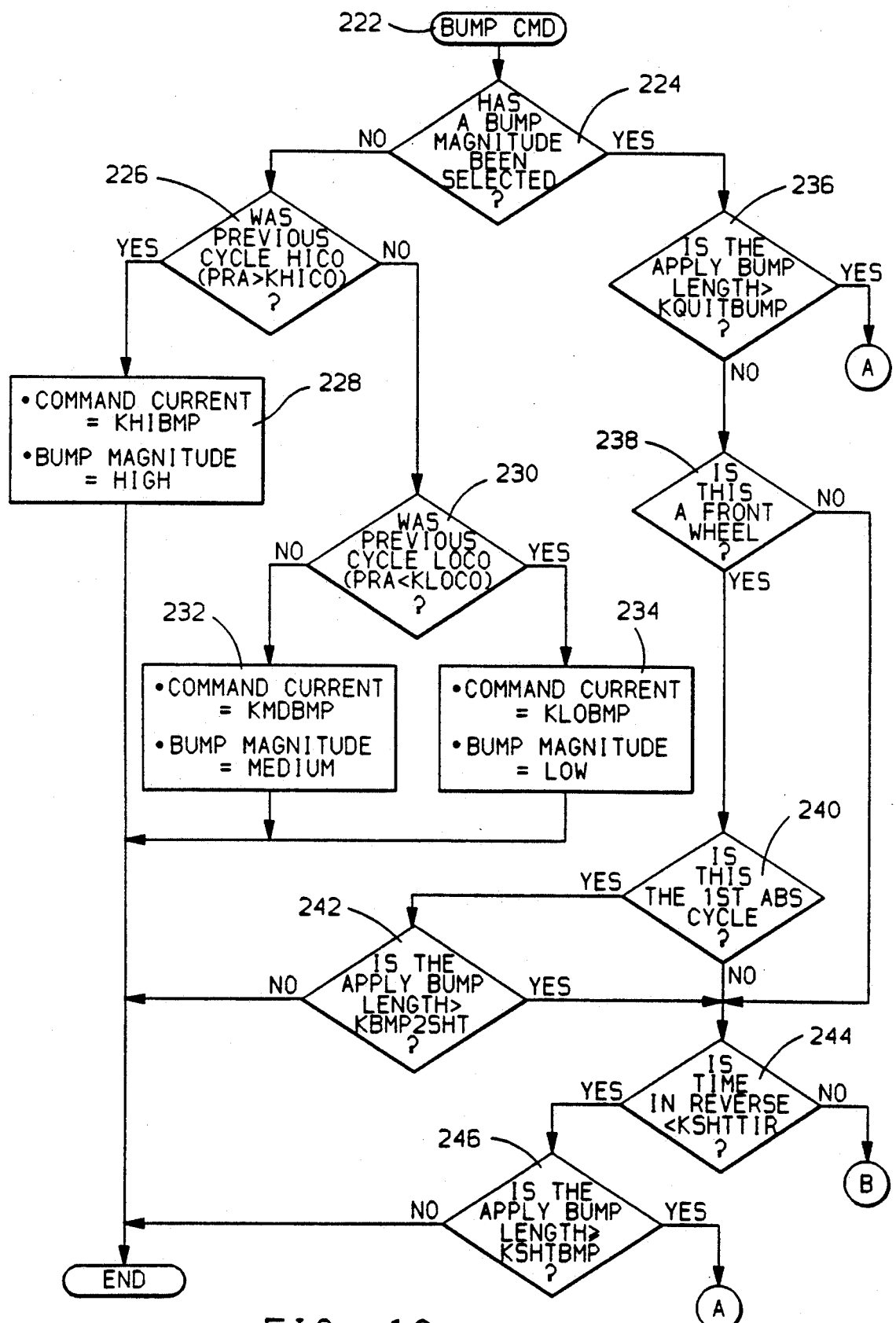
Figure 10B:
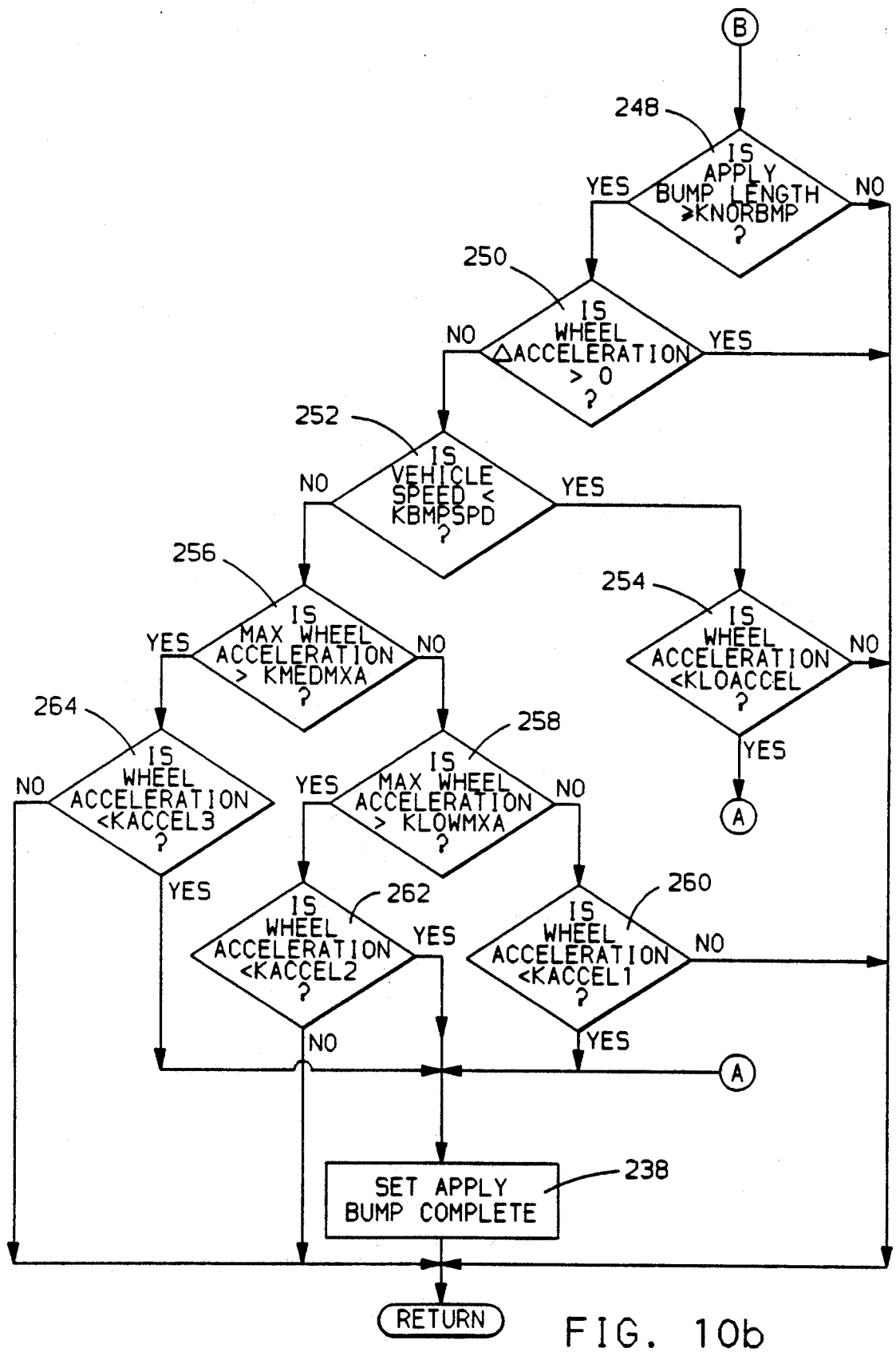

Referring to FIG. 10, the bump command routine 208 is entered at point 222 and advances to a step 224 where it determines if a bump current magnitude has been selected. If not, the routine proceeds to select a bump current magnitude based on the coefficient of friction of the road surface over which the wheel is traveling. As previously indicated, the motor current value PRA existing at the time the step 104 of FIG. 6 first indicated a release mode in response to an incipient wheel lockup condition is representative of the brake pressure giving rise to the incipient wheel lockup condition and is therefore a measure of the road surface coefficient of friction. The routine determines the surface condition and the corresponding magnitude of the apply bump current beginning at step 226 where the motor current value PRA is compared to a high/medium coefficient threshold KHICO. If the motor current exceeds this threshold, a high coefficient of surface is indicated and the motor current command is set to a high value KHIBMP such as 20 amps. If the current value PRA does not exceed the high threshold, the value is compared at step 230 with a threshold KLOCO representing a low/medium coefficient threshold. If the current value exceeds the threshold KLOCO, a medium coefficient of friction surface is indicated and the motor current command is set to an intermediate value KMDBMP such as 16 amps at step 232. If the current value PRA is less than the threshold KLOCO, a low coefficient surface is indicated and the motor current command is set to a low value KLOBMP such as 10 amps at step 234. Following the determination of the bump current magnitude, the routine returns to the apply routine of FIG. 9.

During subsequent iterations of the bump command routine, step 224 will indicate that a bump magnitude has been selected so that the routine then advances to a step 236 to determine if the apply bump period exceeds a maximum duration KQUITBMP. This period is at least one count less than the KMAXTIME count utilized at step 216 to prevent the apply routine from terminating ABS control of the wheel brake as a result of the apply bump. In other words, it is not desirable in this embodiment to exit ABS controlled braking as a result of application of an apply bump. According, if the bump length exceeds the value KQUITBMP, the program proceeds to set a flag indicating the apply bump is complete at step 238.

Assuming however that the apply bump duration has not exceeded the threshold of step 236, a step 238 determines whether or not the routine is being executed in relation to a front wheel at step 238. Front and rear wheels are differentiated here because the preferred embodiment of this routine provides for at least a minimum bump duration in the first ABS pressure cycle after initiation of antilock controlled braking that assures that the motor current at the end of the bump period has a predictable relationship to brake pressure and is therefore a reliable measure of wheel brake pressure. The apply bump of this duration is not provided to the rear wheels in this first ABS cycle since the rear wheels are generally used to develop the vehicle reference velocity. This generally requires the rear wheels to recover substantially to vehicle speed to provide an accurate indication of vehicle speed and further to assure that excessive rear wheel slip does not occur thereby assuring vehicle stability.

Accordingly, if step 238 determines the routine is being executed in relation to a front wheel, a step 240 determines whether or not this is the first ABS pressure cycle. If this is the first ABS pressure cycle, a step 242 compares the length of the apply bump to the minimum value KBMP2SHT representing the bump duration required at the beginning of the apply phase to reverse the motor direction and accelerate the motor such that the motor current is a reliable measure of brake pressure. If this bump length duration has not been achieved, the routine returns to the apply routine of FIG. 9.

If step 238 determines that the routine is being executed in relation to a rear wheel, or step 240 determines that this is not the first ABS pressure cycle, or if step 242 determines the apply bump length in the first ABS pressure cycle for a front wheel has achieved the value KBMP2SHT, the routine advances to a step 244 where the time of release during the prior release phase (determined by step 142 of FIG. 7) is compared with a value KSHTTIR, such as 15 milliseconds, to determine whether or not the pressure released during the release phase was small. If the time in reverse is less than the threshold indicating a shallow pressure cycle, thereby requiring a short apply bump duration in order to establish the brake pressure at the desired value, the routine proceeds to step 246 to compare the apply bump duration to a calibration value KSHTBMP representing the minimum allowable bump duration. If the apply bump duration has not yet achieved this minimum duration, the routine returns to the apply routine of FIG. 9. If the apply bump duration has achieved the minimum duration, the routine proceeds directly to step 238 where the apply bump complete flag is set to indicate the desired apply bump has been delivered.

Returning to step 244, if the time in reverse exceeds the calibration level indicating a substantial cycle depth during the release phase of the current ABS pressure cycle, the routine proceeds to a step 248 where the apply bump length is compared to a normal bump period KNORBMP which may be, 25 milliseconds. If the apply bump has not achieved this duration, the program returns to the apply routine of FIG. 9. If however, step 248 determines the apply bump duration has achieved the normal bump period KNORBMP, the routine proceeds to determine the duration of the bump in accord with wheel acceleration to provide for adaptive control of the bump duration based on actual wheel parameters so as to achieve the objective of quickly establishing the brake pressure at the desired pressure that is a substantial fraction of the brake pressure existing at the wheel brake 14 when the incipient wheel lock condition initiating the the present ABS pressure cycle so as to maximize braking efficiency.

In general, the acceleration of the vehicle wheel is utilized to provide for adaptive control of the duration of the apply bump. The maximum re-acceleration of the wheel following the release of brake pressure in response to an incipient wheel lock condition is a good indication of the depth of the ABS cycle (the amount of pressure decrease) and the amount of pressure that needs to be recovered. High wheel re-accelerations imply deep cycles or a transition from a surface having a low coefficient of friction to a surface having a high coefficient of friction, both of which necessitate a longer apply bump to achieve the desired initial reapply pressure. Conversely, low accelerations imply either shallow cycles on a high coefficient of friction surface or a low coefficient surface, in which case less pressure needs to be recovered by the apply bump. The adaptive apply bump duration is based upon a wheel acceleration threshold that is a predetermined function of the peak wheel reacceleration during the current ABS pressure cycle. Accordingly, the apply bumps are continued until the wheel acceleration decreased to below a peak acceleration dependent calibration value.

Figure 11:
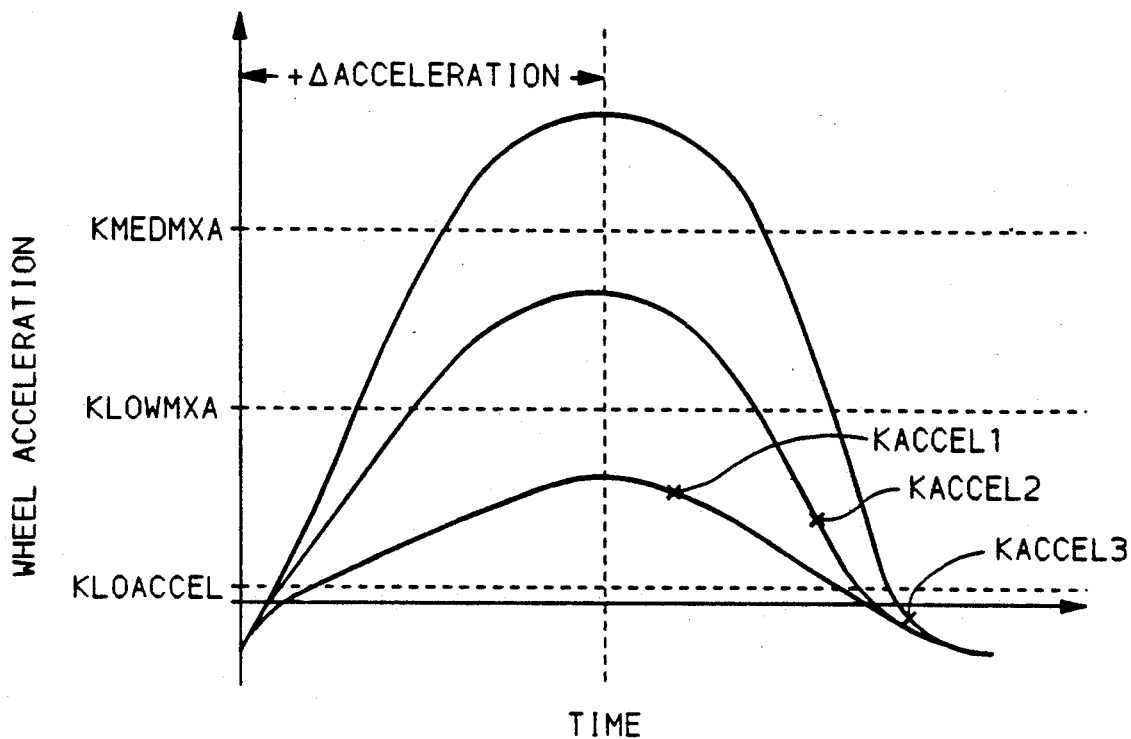

The parameters illustrating the adaptive control of the apply bump duration are illustrated in FIG. 11. The determination of the apply bump duration begins at step 250 where the change in wheel acceleration over the last interrupt interval is compared to zero to determine if wheel acceleration is still increasing in magnitude in response to the previous release phase of the ABS cycle. If the wheel acceleration magnitude is increasing, the routine returns to the apply routine of FIG. 9 and the apply bump is continued. However, if the wheel acceleration is not increasing in magnitude indicating the peak acceleration has occurred, the program advances to a step 252 where the vehicle speed is compared with a low speed threshold KBMPSPD, such as 12 mph. In general, at low vehicle speeds, wheel slip variations are greater than at higher speeds. The wheel acceleration also returns to the vehicle acceleration value (a negative value during braking) more quickly than at higher speeds, so the apply bump based on wheel acceleration would not function to lengthen the apply bump in order to adequately recover the pressure. To compensate for this, at low vehicle speeds, the apply bump duration is based on a low wheel acceleration value independent of the peak acceleration of the wheel so as to extend the apply bump so as to allow the desired amount of pressure to be recovered. Accordingly, if the vehicle speed is less than KBMPSPD, the routine advances to step 254 where the wheel acceleration is compared to a low threshold KLOACCEL, such as 0.25 g. If the wheel acceleration has not decreased below this level, the routine returns to the apply routine of FIG. 9 and the apply bump is continued. However, when the wheel acceleration becomes less than this threshold, the apply bump complete flag is set at step 238 to terminate the apply bump.

Returning now to step 252, assuming the vehicle speed exceeds the low speed threshold, the apply bump duration is established based upon a wheel acceleration threshold value that is in turn a function of the maximum wheel acceleration achieved during the ABS cycle. The maximum acceleration is represented, for example, when step 250 first detects wheel acceleration is not positive. Steps 256 and 258 combine to determine whether the maximum wheel acceleration (A) was greater than a high value threshold KMEDMXA (such as 10 g) indicating either an over-release of brake pressure and the wheel had a high recovery rate or a transition from a low to high coefficient of friction surface, (B) was less than a low threshold KLOWMXA (such as 3.5 g) indicating braking on a low coefficient of friction surface or an under release of brake pressure during the pressure release phase of the ABS cycle, or (C) is intermediate the two threshold levels representing a normal range of maximum wheel acceleration values.

Assuming first a low value of maximum wheel acceleration is detected by steps 256 and 258, a step 260 compares the present wheel acceleration value to a threshold KACCEL1, such as 2.5 g. If the wheel acceleration has not decreased to below this level, the routine returns to the apply routine of FIG. 9 and the apply bump is continued. However, if the wheel acceleration is less than the threshold KACCEL1, the apply bump flag is set at step 238 to terminate the apply bump.

If steps 256 and 258 indicate a maximum wheel acceleration intermediate the two thresholds, a step 262 compares the present wheel acceleration to a second calibration threshold KACCEL2, such as 1 g. If the wheel acceleration has not decreased to below this threshold, the routine returns to the apply routine of FIG. 9 and the apply bump is continued. However, if the wheel acceleration becomes less than this threshold, the apply bump complete flag is set at step 238 to terminate the apply bump. If step 256 determines the maximum wheel acceleration exceeds the high threshold level, the present wheel acceleration is compared to a threshold KACCEL3, such as −0.25 g at step 264. If the wheel acceleration has not decreased to below this threshold the routine returns to the apply routine in FIG. 9 and the apply bump is continued. However, if the wheel acceleration becomes less than this threshold, the apply bump complete flag is set at step 238 to terminate the apply bump.

By operation of the steps 250-264, the apply bump duration is adaptively controlled as a function of wheel parameters so as to recover the correct amount of pressure to assure high braking efficiency.

Returning now to FIG. 9, when step 210 determines that the apply bump flag is set indicating completion of the apply bump, the routine advances to a step 266 where an initial apply current value determining routine is executed to determine an initial value INITRFA of a motor apply current command RFA. In general, it is desirable to reapply the motor current to a level resulting in brake pressure substantially equal to the brake pressure at the end of the apply bump established via the adaptive control of the apply bump described above. This routine accurately determines the motor current that establishes this pressure if the apply bump had a minimum duration such that the measured motor current may be presumed a measure of the brake pressure established by the modulator 16. The minimum duration is a predetermined time KBMP2SHT that assures that the apply bump has reversed the motor direction, initiated motor movement and dissipated the motor negative EMF so that the motor current and wheel brake pressure have a predictable relationship. If the apply bump duration was less than the predetermined time KBMP2SHT, the initial apply current is obtained by other conventional means to be described.

Figure 12:
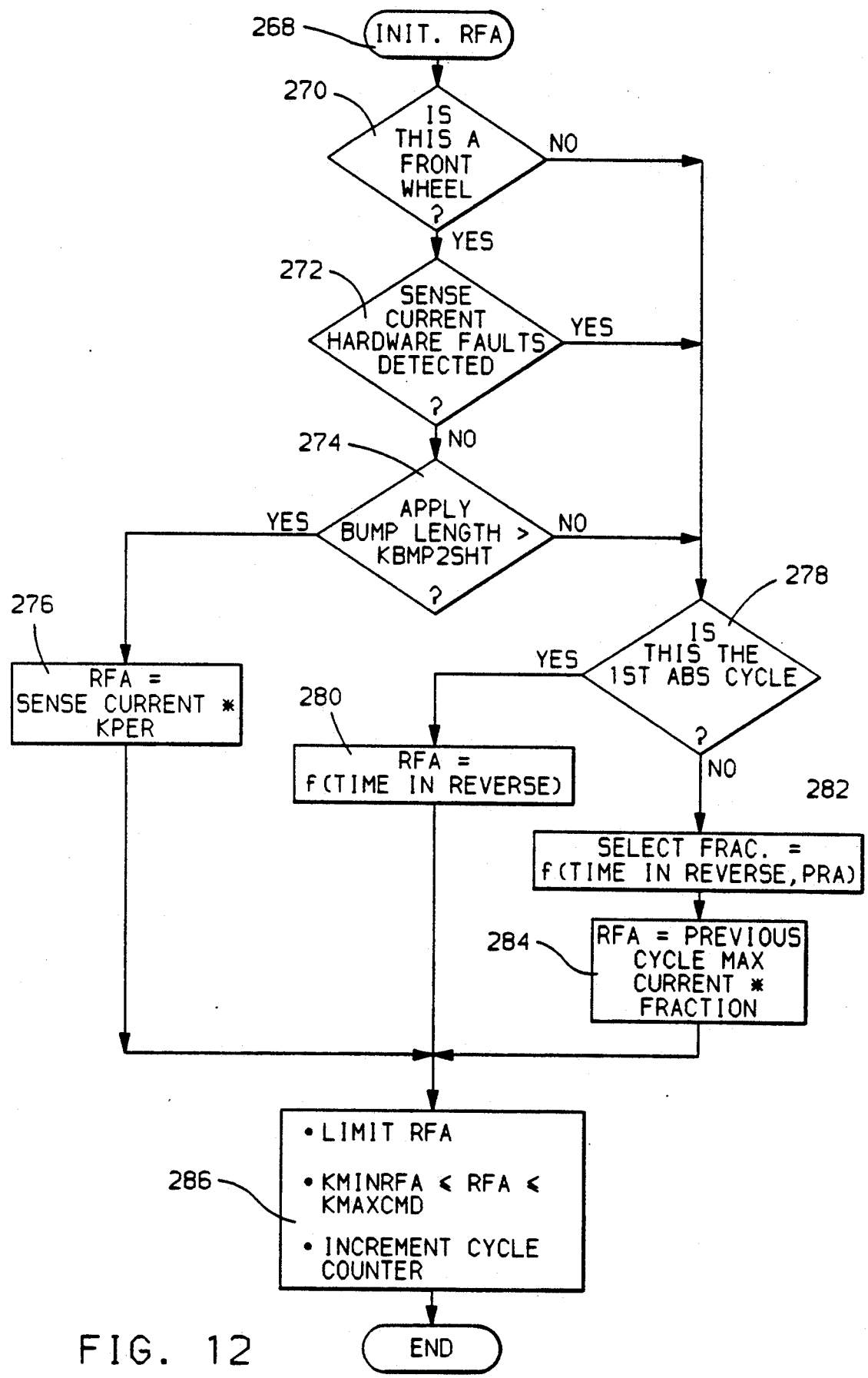

The routine of step 266 for determining the initial reapply current value INITRFA is illustrated in FIG. 12. Referring to this figure, the routine is entered at point 268 and then determines via steps 270-274 if the motor current sensed by the sense resistor 58 is an accurate representation of the braking pressure at the wheel brake 14. In general, the conditions indicating the sense current accurately represents wheel brake pressure include, in this embodiment, (A) the routine is being executed for a front wheel, (B) the diagnostics have not detected a sense current hardware fault, and (C) the apply bump length has exceeded the aforementioned minimum duration KBMP2SHT. Assuming all of these conditions are met, the motor current is a true measure of brake pressure and the program proceeds to establish the initial reapply current value INITRFA of the motor apply current command RFA at the measured sense current times a factor KPER which compensates for noise that may be present in the sense current. By setting the initial value of the motor command current following the apply bump, a brake pressure is established substantially equal to the brake pressure existing at the end of the apply bump.

If the steps 270, 272 or 274 determine that any one of the aforementioned conditions do not exist for using the sense current as the initial reapply current, the routine advances to a step 278 which determines whether or not this is the first ABS pressure cycle of antilock controlled braking. If this is the first cycle and therefore the first apply phase during the antilock controlled braking, the initial value of the reapply current is made a predetermined function of the time in reverse measured by step 142 of FIG. 7. This may be obtained, for example, from a 3×1 ROM look up table.

If this is not the first ABS pressure cycle in the present antilock controlled braking maneuver, the program advances to step 282 where a fraction is obtained from a look up table as a function of the time in reverse and the motor current PRA that existed at the end of the previous apply phase when an incipient wheel lock condition was first sensed and which therefore represents the peak brake pressure during the pressure apply phase of the prior ABS cycle. The initial value of the reapply current RFA is then set at step 284 by multiplying the motor current value RFA by the fraction obtained by step 282 resulting in an initial reapply current representing a fraction of the peak brake pressure in the pressure apply phase of the prior ABS pressure cycle. When the reapply current RFA is established, the routine executes a step 286 which limits the resulting current to minimum and maximum values and increments an ABS cycle counter.

Returning to FIG. 9, upon completion of the routine for determining the initial reapply current, the routine executes a dynamic stop duration routine 288. In general, the apply bump (except for the lowest duration apply bump provided by step 246) would cause the motor to speed up and thereby cause the pressure to overshoot the desired pressure if the energy of the motor were not removed at the end of the apply bump. Accordingly, the current command to the DC motor 30 after the termination of the apply bump is established to provide for dynamic braking of the motor to remove the motor inertia and prepare for application of the initial apply current determined by the routine 266.

Figure 13:
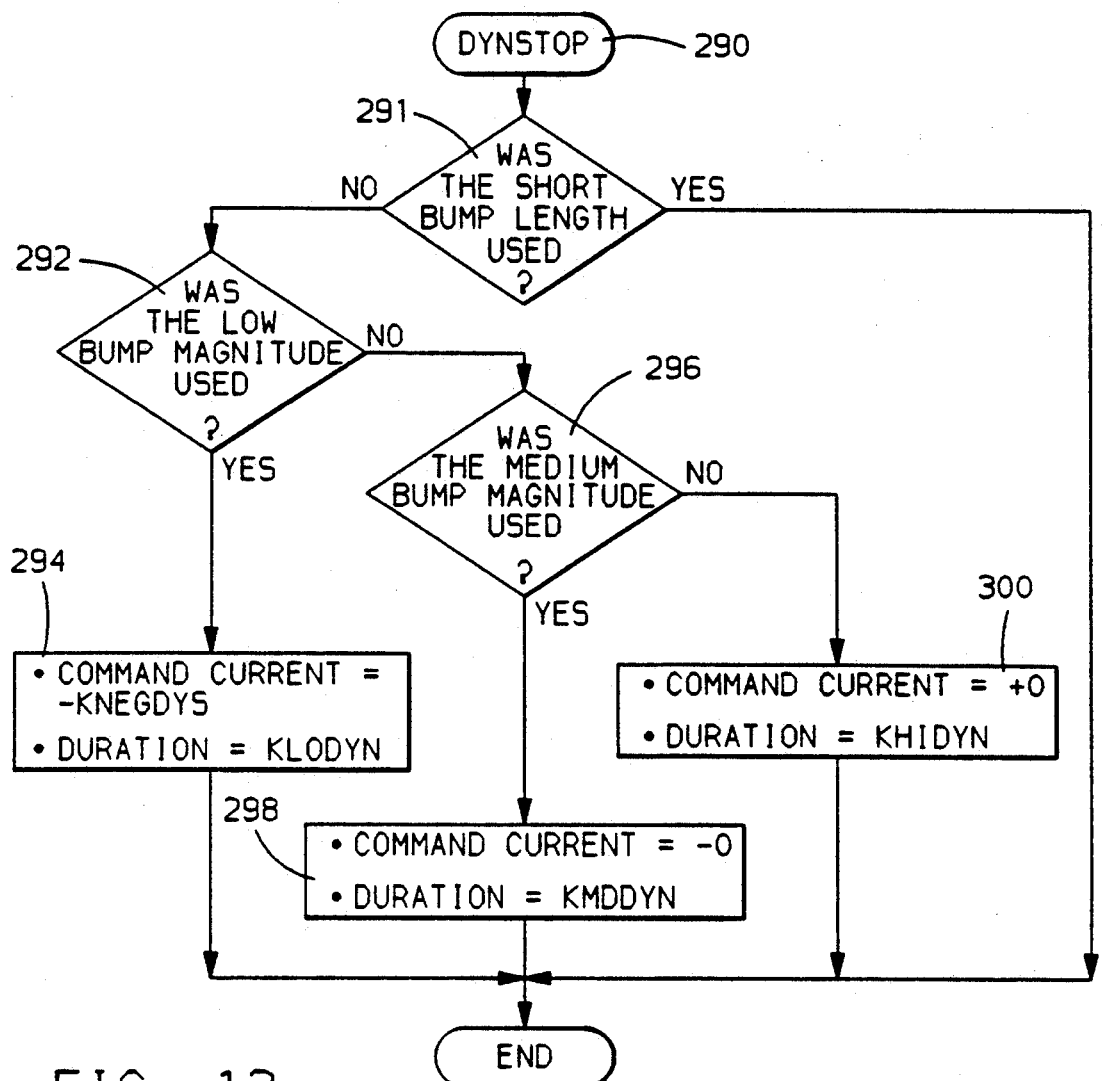

The dynamic stop duration routine is illustrated in FIG. 13. Referring to this figure, the routine is entered point 290 and proceeds to a step 291 to determine if the short apply bump length was used for the apply bump via step 246. If this bump duration was used, the motor speed is slow enough that it is not necessary to dynamically brake the motor prior to application of the initial reapply current. Accordingly, the dynamic stop routine returns to the apply routine of FIG. 9. However, if the apply bump period exceeded the short bump period, the routine proceeds to step 292 to determine if the low bump magnitude was used via operation of the steps 226-234. If so, indicating a low coefficient of friction surface, the command current is set equal to a negative value KNEGDYS such as −3.0 amps and dynamic braking duration is set equal to KLODYN. This command current provides for dynamic braking by dissipating the motor EMF and further provides for initiating motor movement in the reverse direction.

Returning to step 292, if the low bump current magnitude was not used, the routine advances to step 296 to determine whether the medium bump magnitude was used via the steps 226-234. If so, indicating a medium coefficient of friction surface, the motor current command is set equal to a negative zero (a zero current command with the motor set in reverse direction), with a dynamic braking duration set equal to KMDDYN. This command provides for dissipation of the motor EMF to provide for dynamic braking.

If step 296 indicates that the high bump magnitude was used by the bump command routine 208, step 300 sets the command current to zero with the motor set in the forward direction and further sets the dynamic braking duration at KHIDYN. In general, a high braking pressure will exist following the high magnitude apply bump so that the brake pressure acting on the head of the piston 32 will function to stop the motor rotation. Accordingly, it is not necessary to dissipate the motor reverse EMF.

When the dynamic braking current and duration values are established, the dynamic stop routine returns to the apply routine of FIG. 9. Returning to FIG. 9, following execution of the dynamic stop routine 288, the routine returns to the brake mode routine of FIG. 6 via the steps 212 and step 220, the current command resulting from the routines 266 and 288 being less than the maximum command current value represented by the threshold used in step 212.

During subsequent iterations of the apply routine, the routine advances directly from step 206 to a step 302 which determines if the dynamic stop and application of the initial apply current value determined at step 266 is complete. Assuming that the dynamic stop and the application of the initial apply current RFA is not complete, the routine proceeds to step 304 to determine if the dynamic stop is complete. If not, the routine proceeds to step 212 and then to step 220 after which the apply routine returns to the brake mode routine of FIG. 6. Until such time that the dynamic stop is complete by application of the current established by the dynamic stop routine and for the duration established therein, the aforementioned steps are repeated with each iteration of the apply routine.

Figure 15:
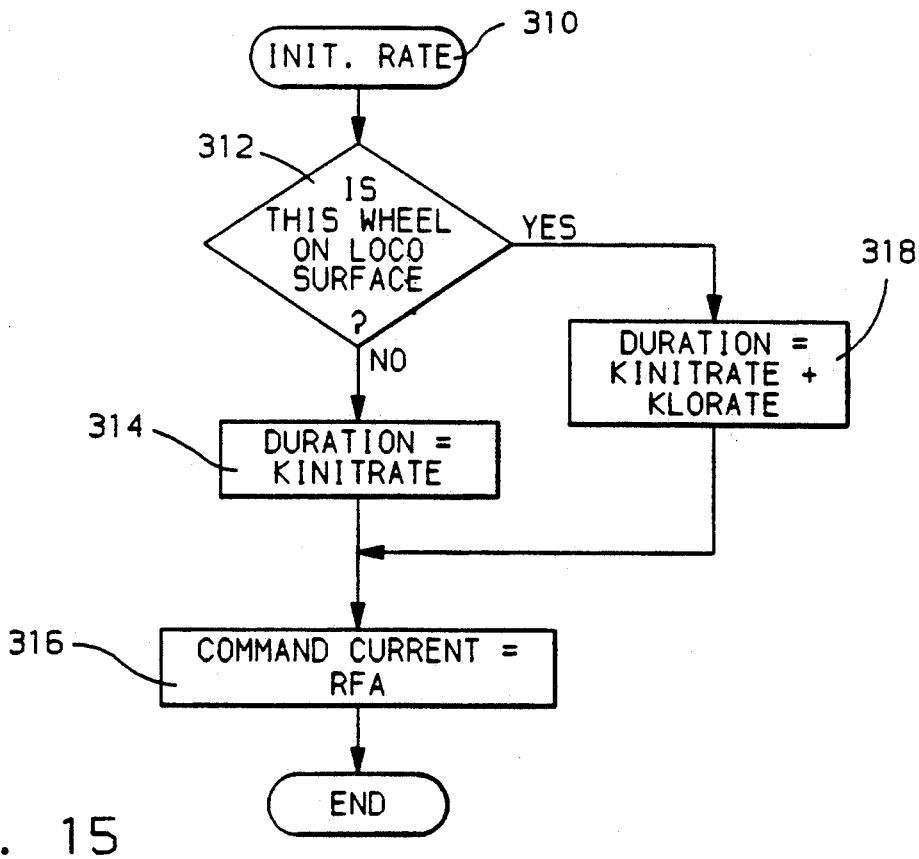

When the dynamic stop duration established by the routine of FIG. 13 has expired, the routine then proceeds to apply the initial value INITRFA apply motor current determined by the routine of FIG. 12. This is initiated at step 306 where the routine determines if an initial rate has been computed. This initial rate is a period of time that the initial current value is applied before the current is ramped to increase the brake pressure applied to the wheel brake. In general, the duration is simply a function of the coefficient of friction of the road surface over which the wheel is traveling. This routine of step 308 is illustrated in FIG. 15. The routine is entered at step 310 and proceeds to step 312 where it determines if the wheel is on a low coefficient of friction surface such as represented by the value PRA of motor current at the end of the previous apply phase of the prior ABS antilock pressure cycle. If this current value, representing the brake pressure at the time the incipient wheel lock up condition was last sensed, is greater than a low value indicating the wheel is not being braked on a low coefficient of friction surface, the routine advances to step 314 where the initial rate duration is established at a value KINITRATE. Thereafter, the command current is set equal to the initial value INITRFA established by the routine of FIG. 12. If step 312 indicates the wheel is on a low coefficient of friction surface, the initial rate duration is set equal to KINITRATE plus a constant KLORATE at step 318. Thereafter, step 316 is executed to set the command current at the initial value RFA. In general, on a low coefficient of friction surface, the duration of the initial apply current is longer to provide for less aggressive operation of the antilock controlled braking pressure.

Following step 308 and following step 306 during subsequent iterations of the apply routine, step 318 determines if the initial rate period has been completed. If not, the apply routine returns to the brake mode routine via steps 212 and 220. When step 318 first indicates that the initial rate duration has been completed, the routine proceeds then to a step 320 to execute a routine for ramping the motor current to increase the brake pressure. This routine may take the form as illustrated in U.S. Pat. No. 5,071,199 issued Dec. 10, 1991. The pressure current ramping routine for increasing the brake pressure at step 320 is thereafter executed with each iteration of the apply routine via step 302.

The ramping routine of step 320 is executed with each iteration of the apply routine to increase the motor current value until such time that an incipient wheel lock up condition is again sensed by step 104 first indicating a release mode wherein the ABS pressure cycle is completed and a new one is initiated.

If the brake pressure output of the master cylinder 12 established by the vehicle operator and/or the road surface condition should become such that the operator applied brake pressure will not result in an incipient wheel lock up condition, the current command to the motor 40 will continue to be increased by the ramp routine 320 until such time that the current command exceeds the maximum current command KMAXCMD as detected at step 212. When this condition is detected, the maximum current command is limited to the maximum value and a maximum current counter is incremented. When step 216 senses that the maximum current counter has attained the time KMAXTIME, antilock control braking of the wheel is terminated by step 218 by clearing the antilock brake active flag. The calibration value KMAXTIME is such that if the motor current command is at the maximum value for that duration, the piston has been positioned to its fully extended position at which the check ball 36 is unseated from the seat 38 to open communication between the master cylinder 12 and the wheel brake 14. Thereafter, the routine proceeds from step 118 from FIG. 6 through steps 120 where the command current is established at zero and step 122 where the motor driver interface is disabled and the solenoid 46 is de-energized to open the bypass passage. This concludes the antilock braking maneuver and establishes the initial condition for the system to again initiate antilock controlled braking in response to an incipient wheel lockup condition.

Figure 14:
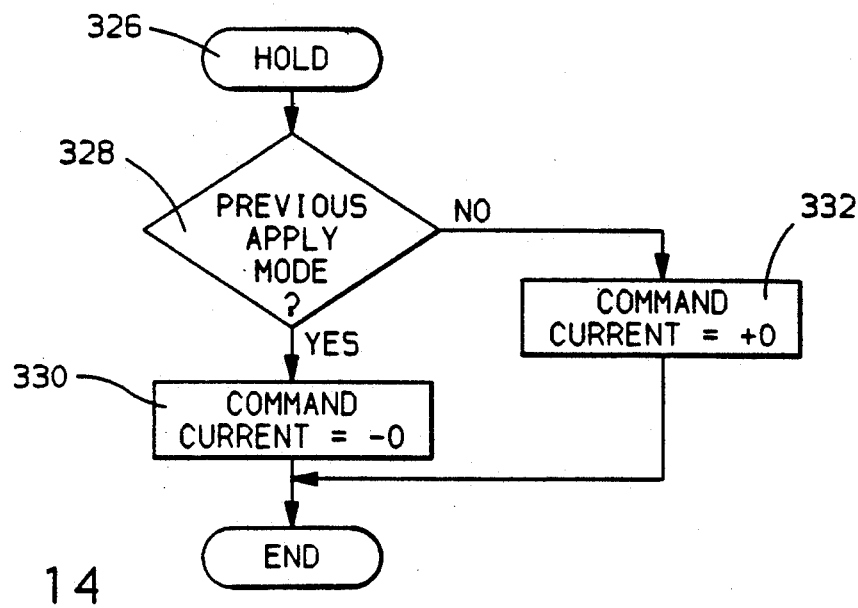

The ABS may optionally include the hold mode as called for by step 104 when wheel slip and wheel acceleration represent onset of an incipient wheel lock condition. Returning to step 200 of FIG. 9, if the brake mode determined by step 104 is a hold mode, the routine advances to a step 322 where the routine determines whether or not the system has provided for an apply mode during the present ABS pressure cycle. If not, a hold mode routine 324 is executed as illustrated in FIG. 14. As seen in this figure, the hold mode is entered at step 326 and proceeds to step 328 to determine if an apply mode was previously executed in the present ABS pressure cycle. If so, the current command is set to zero in a motor reverse direction at step 330 to provide for brake pressure hold. If however, the hold mode was not determined after the system had previously determined an apply mode in the present ABS cycle, the routine proceeds from step 328 to step 332 where the command current is set to zero with the motor direction set in the forward direction. The routine of FIG. 14 then returns to the apply routine of FIG. 9.

If the hold mode is established after an apply mode, the routine does not provide for holding the motor current constant until such time that the apply bump and dynamic stop established during the apply mode has been completed as previously described. Accordingly, when this condition is sensed at step 322, a step 334 determines if the apply bump and dynamic stop associated with the prior determined hold mode had been completed. If not, the routine proceeds to complete those functions. When completed, the routine then proceeds from step 334 to the hold routine 324 as previously described. If a step 336 determines the hold mode duration is excessive, the routine proceeds to execute the apply mode as previously described.

In accord with the foregoing, an antilock brake system is described providing adaptive control of the brake pressure so as to maximize the efficiency of the wheel braking during antilock brake controlled braking. While a specific embodiments have been described, it is understood that many modifications may be made by the exercise of skill on the art without departing from the scope of the invention.

The embodiments of the invention in which an exclusive property or privilege is claimed are defined as follows:

1. A method of antilock control of the brake pressure applied to a brake of a vehicle wheel traveling over a road surface in a vehicle braking system having a pressure modulator for modulating the applied brake pressure during antilock controlled braking of the wheel, the method comprising the steps of:
measuring wheel slip;
measuring wheel slip rate of change; and
cyclically:
(A) detecting an incipient wheel lock condition,
(B) controlling brake pressure during a release phase of an ABS pressure cycle in response to the detected incipient wheel lock condition by:
(a) controlling the modulator to release brake pressure and
(b) interrupting the control of the modulator to release brake pressure, while the measured wheel slip rate of change is less than a threshold level that is a predetermined function of a predetermined wheel parameter, by controlling the modulator to hold the wheel brake pressure,
(C) detecting recovery from the wheel lock condition, and
(D) controlling brake pressure during an apply phase of the ABS pressure cycle in response to the detected recovery from the wheel lock condition by controlling the modulator to apply brake pressure.

2. The method of claim 1 wherein the predetermined wheel parameter is the measured wheel slip.

3. The method of claim 1 further including the step of measuring wheel acceleration and wherein the predetermined wheel parameter is the measured wheel acceleration.

4. A method of antilock control of the brake pressure applied to a brake of a vehicle wheel traveling over a road surface in a vehicle braking system having a pressure modulator for modulating the applied brake pressure during antilock controlled braking of the wheel, the method comprising the steps of:
measuring wheel slip;
measuring wheel slip rate of change; and
cyclically:
(A) detecting an incipient wheel lock condition,
(B) detecting recovery from the wheel lock condition,
(C) initiating an ABS pressure cycle in response to the detected incipient wheel lock condition, the ABS pressure cycle including a pressure release phase and a pressure apply phase,
(D) controlling brake pressure during the release phase of the ABS pressure cycle in response to the detected incipient wheel lock condition to allow recovery from the wheel lock condition by:

(a) controlling the modulator to release brake pressure and
(b) interrupting the control of the modulator to release brake pressure, while the measured wheel slip rate of change is less than a threshold level that is a predetermined function of the measured wheel slip, by controlling the modulator to hold the wheel brake pressure, and
(E) controlling brake pressure during the apply phase of the ABS pressure cycle in response to the detected recovery from the wheel lock condition by controlling the modulator to apply brake pressure.

5. A method of antilock control of the brake pressure applied to a brake of a vehicle wheel traveling over a road surface in a vehicle braking system having a pressure modulator for modulating the applied brake pressure during antilock controlled braking of the wheel, the method comprising the steps of:

determining wheel slip;
determining wheel slip rate of change; and
cyclically:
(A) detecting an incipient wheel lock condition,
(B) controlling brake pressure during a release phase of an ABS pressure cycle in response to the detected incipient wheel lock condition by:
(a) controlling the modulator to release brake pressure and
(b) interrupting the control of the modulator to release brake pressure, while the measured wheel slip rate of change is less than a threshold level that is a predetermined function of a predetermined wheel parameter for a first interruption of the control of the modulator to release brake pressure and during a predetermined recovery condition of the wheel for subsequent interruptions of the control of the modulator to release brake pressure, by controlling the modulator to hold the wheel brake pressure,
(C) detecting recovery from the wheel lock condition, and
(D) controlling brake pressure during an apply phase of the ABS pressure cycle in response to the detected recovery from the wheel lock condition by controlling the modulator to apply brake pressure.

6. The method of claim 5 further including the step of measuring wheel acceleration and wherein the predetermined wheel parameter is the measured wheel slip and the predetermined recovery condition of the wheel is one of a predetermined slip rate of change and a predetermined wheel acceleration.

7. The method of claim 5 further including the step of limiting the duration of the first interruption of the control of the modulator to release brake pressure at a predetermined time.

* * * * *